United States Patent
Hackett et al.

(10) Patent No.: US 11,409,133 B2
(45) Date of Patent: Aug. 9, 2022

(54) OXYGEN PERMEABLE SCLERAL CONTACT LENSES USING PATTERNED AIR CAVITIES

(71) Applicant: Tectus Corporation, Saratoga, CA (US)

(72) Inventors: Benjamin Lyle Hackett, Saratoga, CA (US); Donald Arthur Ice, Milpitas, CA (US); Allen Ming-Kuang Han, Mountain View, CA (US)

(73) Assignee: Tectus Corporation, Saratoga, CA (US)

( * ) Notice: Subject to any disclaimer, the term of this patent is extended or adjusted under 35 U.S.C. 154(b) by 435 days.

(21) Appl. No.: 16/670,515

(22) Filed: Oct. 31, 2019

(65) Prior Publication Data

US 2021/0132409 A1    May 6, 2021

(51) Int. Cl.
*G02C 7/04*    (2006.01)
*G02B 27/01*   (2006.01)
*G02C 11/00*   (2006.01)
*G03B 21/20*   (2006.01)

(52) U.S. Cl.
CPC ......... *G02C 7/049* (2013.01); *G02B 27/0172* (2013.01); *G02C 7/04* (2013.01); *G02C 11/10* (2013.01); *G02B 2027/013* (2013.01); *G02B 2027/0132* (2013.01); *G03B 21/2033* (2013.01)

(58) Field of Classification Search
CPC .......... G02B 27/0172; G02B 2027/013; G02B 2027/0132; G02C 11/10; G02C 7/049; G02C 7/04; G03B 21/2033
USPC ...................................................... 351/159.7
See application file for complete search history.

(56) References Cited

U.S. PATENT DOCUMENTS

| | | | |
|---|---|---|---|
| 3,973,838 | A | 8/1976 | Page |
| 4,486,577 | A | 12/1984 | Mueller |
| 4,594,401 | A | 6/1986 | Takahashi |
| 4,954,587 | A | 9/1990 | Mueller |
| 5,548,352 | A | 8/1996 | Dewey |
| 6,106,553 | A | 8/2000 | Feingold |
| 8,153,726 | B2 | 4/2012 | Hoffman |
| 8,786,675 | B2 | 7/2014 | Deering |

(Continued)

OTHER PUBLICATIONS

Arianpour et al, "Wearable telescopic contact lens"; Applied Optics, vol. 54, No. 24; Aug. 20, 2015; p. 7195-7204.

(Continued)

*Primary Examiner* — William R Alexander
(74) *Attorney, Agent, or Firm* — Fenwick & West LLP

(57) ABSTRACT

A contact lens has a core thick enough to accommodate a payload. The lens further has outer and inner coverings that cover parts of the core. Each covering is a thin layer of gas-permeable material shaped to form a respective cavity between the covering and the core. Oxygen passes through the outer covering to the outer cavity, through an air path within the core to the inner cavity, and through the inner covering to reach the cornea of the wearer's eye. To increase oxygen flow, a patterned structure is formed at an interface between the core and at least one of the outer and inner covering, comprising supports at which the core and covering contact, and recesses forming the cavity between the core and covering for oxygen flow. Because each recess spans only a short distance between supports, portions of the covering may be made thinner to improve oxygen flow.

23 Claims, 16 Drawing Sheets

(56) References Cited

U.S. PATENT DOCUMENTS

| | | | |
|---|---|---|---|
| 8,911,078 B2 | 12/2014 | Meyers | |
| 9,039,171 B2 | 5/2015 | Groisman | |
| 9,063,352 B2 | 6/2015 | Ford | |
| 9,310,627 B2 | 4/2016 | Havenstrite | |
| 9,341,864 B2 | 5/2016 | De Juan, Jr. | |
| 9,389,434 B2 | 7/2016 | Jubin | |
| 9,395,468 B2 | 7/2016 | Havenstrite | |
| 9,442,307 B2 | 9/2016 | Meyers | |
| 9,740,026 B2 | 8/2017 | De Juan, Jr. | |
| 10,359,648 B2 * | 7/2019 | Kim | G02C 11/10 |
| 10,754,178 B2 * | 8/2020 | Kim | G02C 11/10 |
| 2006/0290882 A1 | 12/2006 | Meyers | |
| 2010/0001926 A1 | 1/2010 | Amirparviz | |
| 2010/0118262 A1 | 5/2010 | Rosenthal | |
| 2012/0218508 A1 | 8/2012 | Pugh | |
| 2012/0232649 A1 | 9/2012 | Cuevas | |
| 2013/0184554 A1 | 7/2013 | Elsheikh | |
| 2013/0308092 A1 | 11/2013 | Groisman | |
| 2014/0192315 A1 | 7/2014 | Liu | |
| 2015/0234204 A1 | 8/2015 | Havenstrite | |
| 2015/0312560 A1 | 10/2015 | Deering | |
| 2016/0054589 A1 | 2/2016 | Otts | |
| 2016/0091737 A1 * | 3/2016 | Kim | G02C 7/04 |
| | | | 156/60 |
| 2016/0216534 A1 | 7/2016 | Legerton | |
| 2016/0266406 A1 | 9/2016 | Meyers | |
| 2016/0349535 A1 | 12/2016 | Creighton | |
| 2016/0379054 A1 | 12/2016 | Sicari | |
| 2017/0242269 A1 | 8/2017 | Havenstrite | |
| 2017/0299692 A1 | 10/2017 | Krasner | |
| 2017/0299892 A1 | 10/2017 | Pugh | |
| 2017/0360994 A1 | 12/2017 | Havenstrite | |
| 2018/0088350 A1 | 3/2018 | Otts | |
| 2018/0203257 A1 | 7/2018 | Pugh | |
| 2018/0224671 A1 | 8/2018 | Lemoff | |
| 2019/0250432 A1 * | 8/2019 | Kim | G02C 11/10 |

OTHER PUBLICATIONS

Harvitt, D.M. et al., "Re-Evaluation of the Oxygen Diffusion Model for Predicting Minimum Contact Lens Dk/t Values Needed to Avoid Corneal Anoxia," Optometry and Vision Science, 1999, pp. 712-719, vol. 76, No. 10.

Holden, B.A. et al., "Critical Oxygen Levels to Avoid Corneal Edema for Daily and Extended Wear Contact Lenses," Investigative Ophthalmology & Visual Science, Oct. 1984, pp. 1161-1167, vol. 25, No. 10.

PCT International Search Report and Written Opinion, PCT Application No. PCT/US2018/016419, dated Apr. 4, 2018, 11 pages.

PCT International Search Report and Written Opinion, PCT Application No. PCT/US2019/060071, dated Jan. 22, 2020, 17 pages.

* cited by examiner

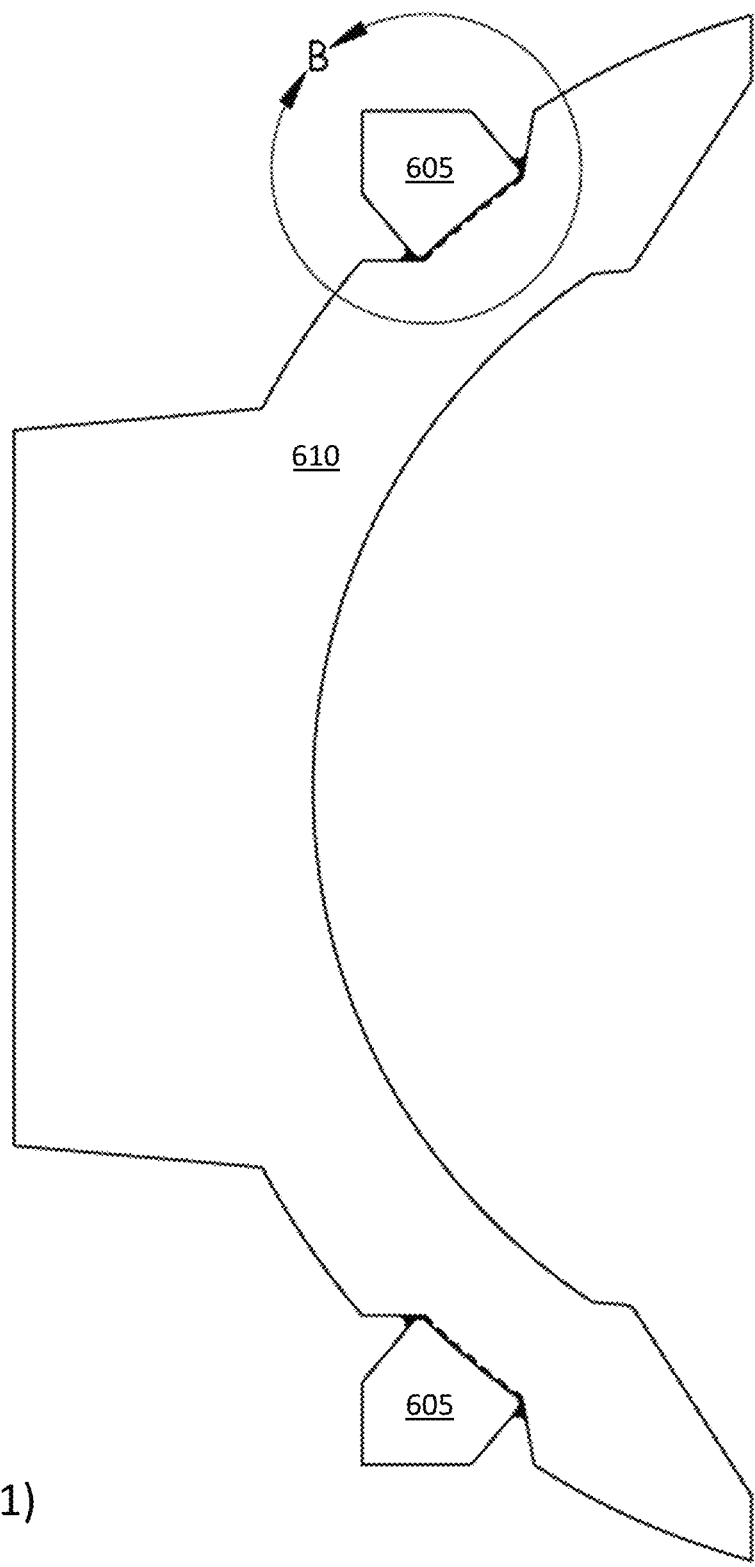
FIG. 6A(1)

DETAIL B FROM FIG. 6A(1)
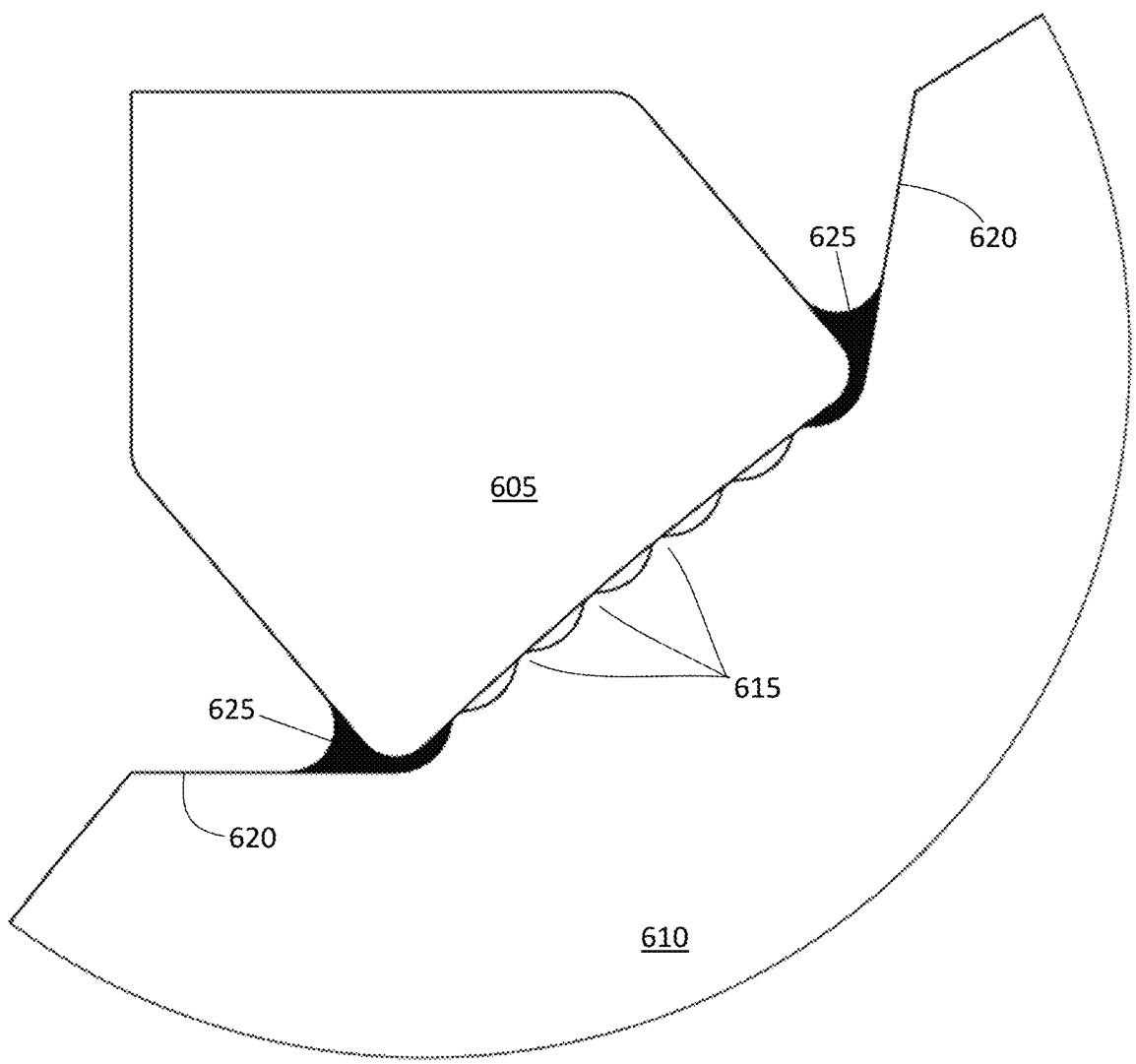
FIG. 6A(2)

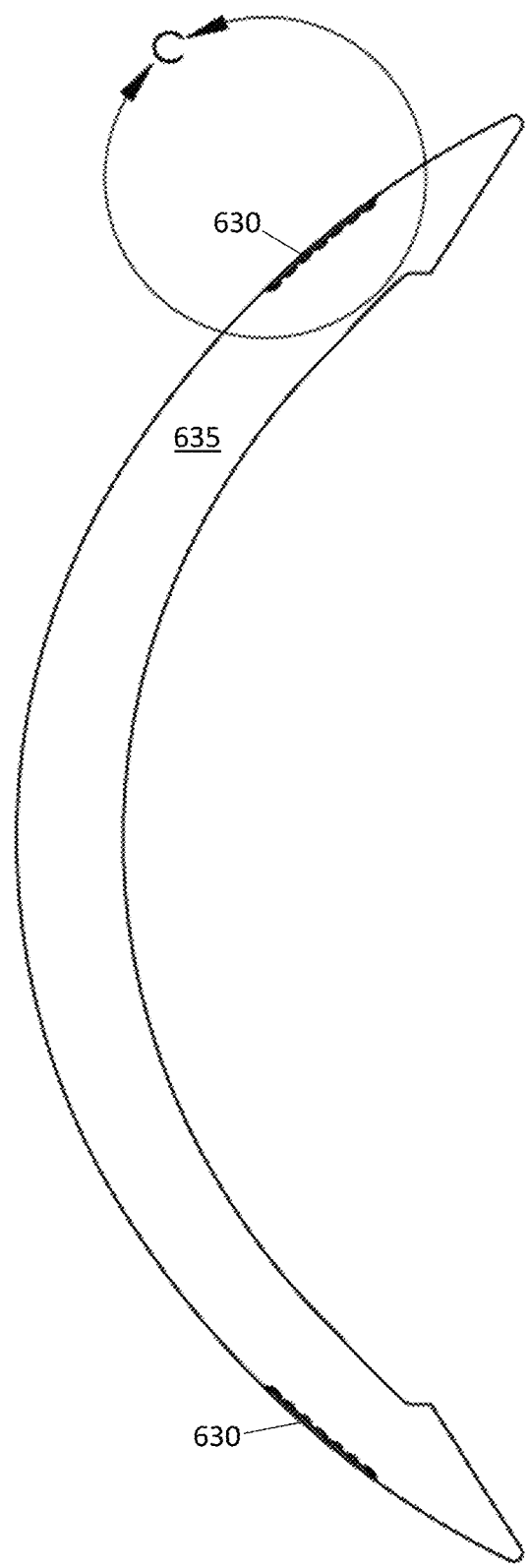
FIG. 6B(1)

DETAIL C FROM FIG. 6B(1)
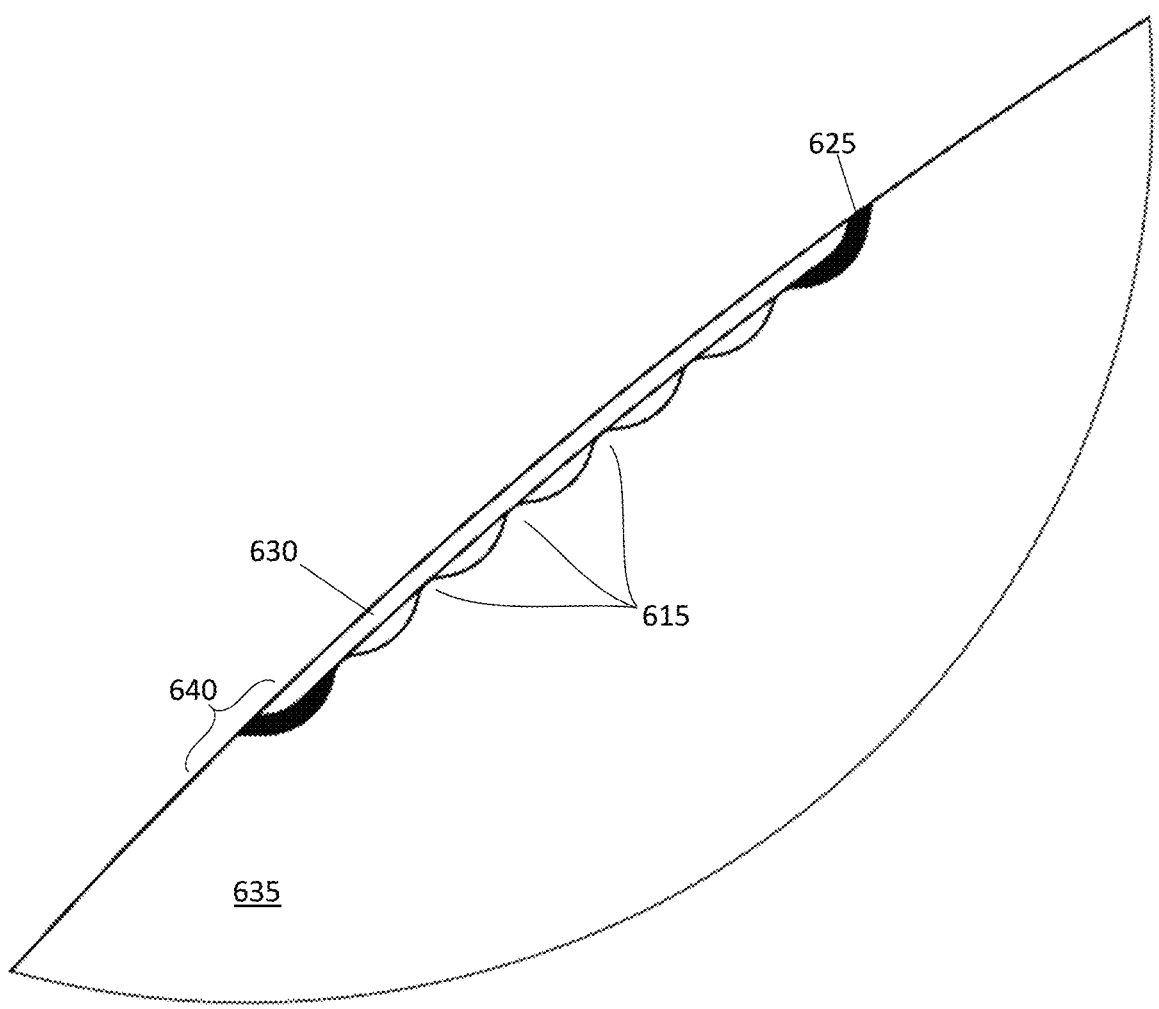
FIG. 6B(2)

OXYGEN PERMEABLE SCLERAL CONTACT LENSES USING PATTERNED AIR CAVITIES

BACKGROUND

1. Technical Field

This disclosure relates generally to contact lenses and in particular to oxygen permeable thick contact lenses, for example scleral contact lenses that carry electronic payloads.

2. Description of Related Art

Contact lenses that provide refractive vision correction are commonplace. Most contact lenses in use today are so-called soft contact lenses. They are relatively thin and made of oxygen permeable hydrogels. Oxygen passes through the contact lens material to the cornea. Sufficient oxygen supply is an important requirement for any contact lens because, due to the lack of blood vessels within the human cornea, the tissue that makes up the cornea receives oxygen through exposure to the air. Without a sufficient flow of oxygen through the contact lens, the cornea would suffer.

Recently, there has been increased interest in contact lenses that perform functions other than vision correction. In many of these applications, a contact lens may carry a payload for performing various functions. For example, a contact lens may contain a payload of one or more electrical components, such as projectors, imaging devices, sensors, gyroscopes, batteries, MEMS (micro-electro-mechanical systems), accelerometers and magnetometers, etc. The contact lens must have a sufficient thickness and structural integrity to accommodate the payload. However, increasing the thickness of a contact lens reduces the amount of oxygen that is transmitted through the material of the contact lens to reach the cornea. Often, the payload itself also is not gas permeable, which further reduces the oxygen flow.

As a result, it can be challenging to provide an oxygenation path from the external environment to the cornea, while still meeting the other requirements of the contact lens.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 6A shows a side cross-section view of a core component and outer covering component assembled together, where a patterned structure is formed on the core component, in accordance with some embodiments.

FIG. 6B shows a side cross-section view of the core component and outer covering component of FIG. 6A assembled together and cut down to form the scleral contact lens.

DETAILED DESCRIPTION OF THE PREFERRED EMBODIMENTS

Figure 1A:
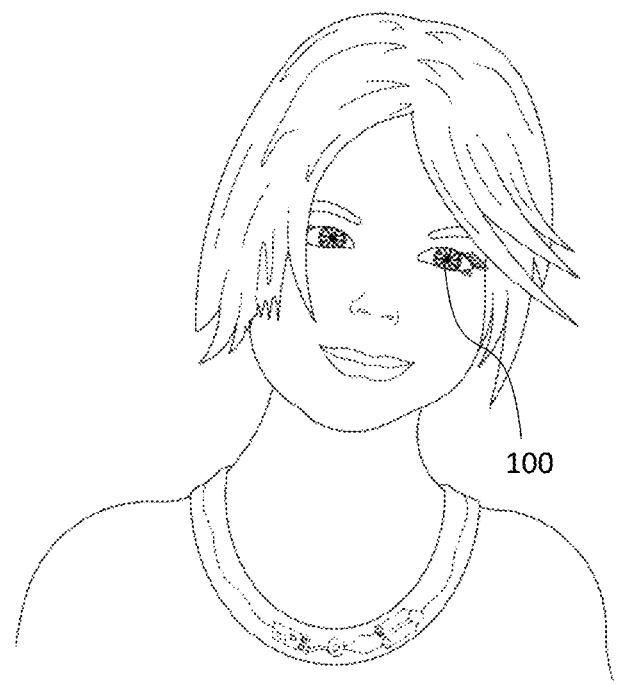
FIG. 1A shows a user wearing a display mounted in a scleral contact lens, in accordance with some embodiments.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A contact lens may carry a payload for performing various functions. For example, a contact lens may contain a payload of one or more electrical components, such as a projector, an imaging device, one or more sensors, etc. The contact lens must have a sufficient thickness to accommodate the payload. However, increasing the thickness of a contact lens may reduce the amount of oxygen that can be transmitted through the material of the contact lens to reach the cornea.

In order to ensure sufficient corneal oxygenation while maintaining sufficient structural integrity, a scleral contact lens may be constructed in three layers, including an outer covering, a middle structure, and an inner covering. The middle structure may contain a payload(s) and is referred to as the core. The core may comprise a material having mechanical integrity to carry the payload. In some embodiments, the core material has poor oxygen transmissibility.

A portion of the outward-facing (i.e., facing the external environment) surface of the core is covered by the outer covering in areas that are exposed to ambient oxygen. The inner covering covers an inward-facing surface of the core above the user's cornea. When worn by a wearer, the outer covering faces the outside environment, while the inner covering is proximate to the wearer's cornea. The outer covering and inner covering are each a thin layer of gas-permeable material, each shaped to form a respective interstitial cavity between them and the core (also referred to as "air gaps"). The cavities are connected by an air path (e.g., air shafts) that traverses the core. Oxygen from the outside environment passes through the gas-permeable outer covering to reach the outer cavity formed between the outer covering and the core, through the air path to the inner cavity formed between the core and the inner covering, and through the gas-permeable inner covering to reach the cornea of the wearer's eye.

The structure and material of the coverings influences the amount of oxygen that is able to flow from the outside environment to the user's cornea. The flow of oxygen may be increased by decreasing the thickness of the coverings. However, thinner coverings do not have the structural integrity to span long distances without support. In some embodiments, the inner covering, outer covering, and/or the core are formed to have a patterned structure of varying thicknesses, such as a pattern of blind holes. The patterned structure may be a pattern of recesses interspersed with supports. The core and covering contact each other at the supports, and the recesses form the cavity for oxygen flow. Because each recess spans only a short distance between supports, the covering may be made thinner, thus increasing oxygen transmission. FIGS. 1-2 below illustrate the general structure of a multi-layer contact lens comprising a core, outer covering, and inner covering, while FIGS. 3-7 illustrate embodiments of patterned structures that may be formed as part of the contact lens.

Figure 2:
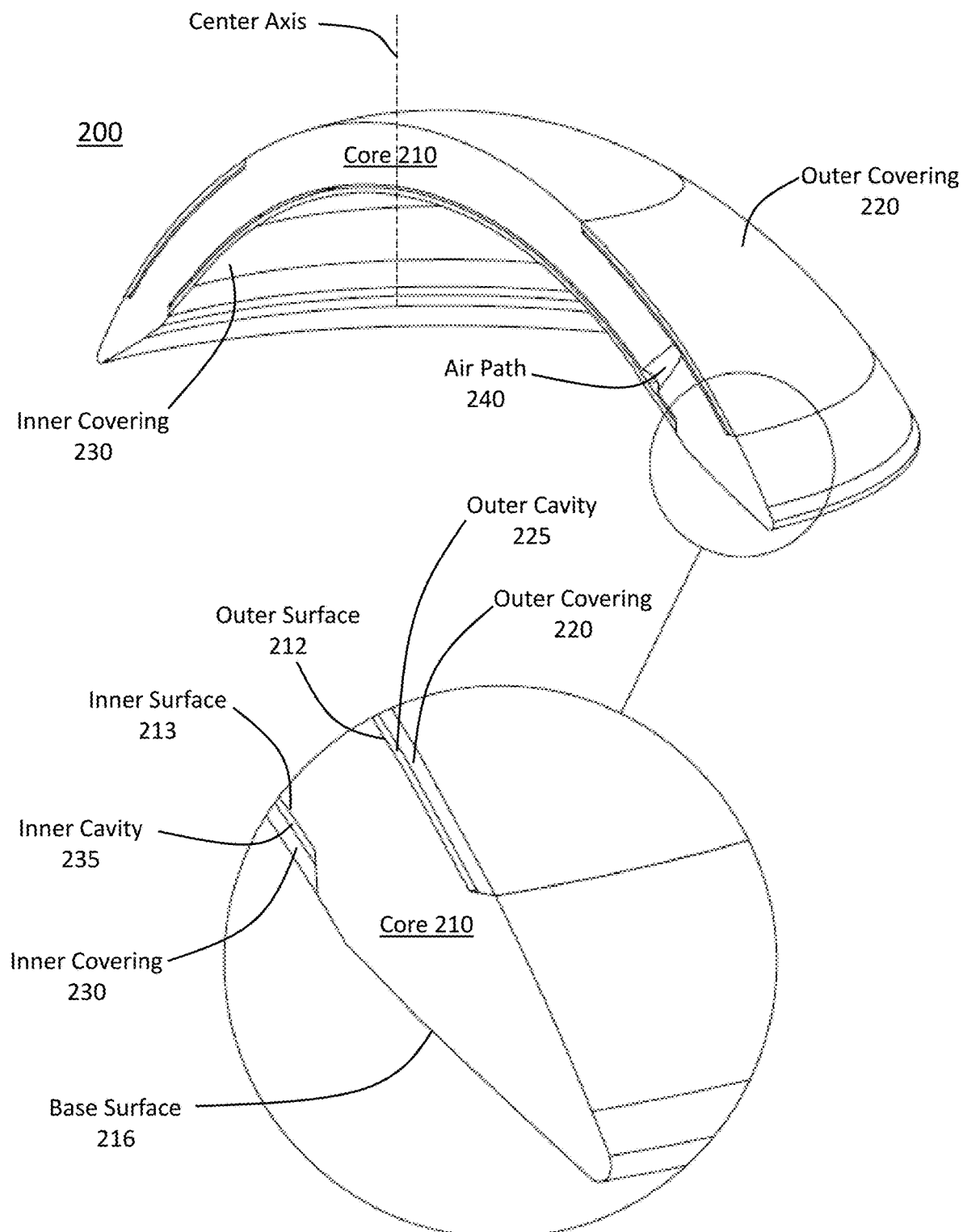
FIG. 2 is a simplified perspective view of a scleral contacts lens able to accommodate a thick payload, where the contact lens is configured to be mounted on the user's eye, in accordance with some embodiments.

FIG. 1A shows a user wearing a display mounted in a scleral contact lens, in accordance with some embodiments. In some embodiments, the user may wear a scleral contact lens on one eye. In other embodiments, the user may wear a scleral contact lens over each eye. In cases where the user wears a pair of scleral contact lens, each of the scleral contact lenses may contain different payloads, allowing each scleral contact lens to perform different functions. For example, in some embodiments, each scleral contact lens may comprise a projector configured to project images into a respective eye of the user, but also comprise different sensors or other components to provide different types of functionality.

In some embodiments, due to space for processing components on the scleral contact lens being limited, the scleral contact lens 100 is configured to interface with an external device to provide certain functionalities, such as image processing functions, sensor analysis functions, etc. In addition, in some embodiments, the scleral contact lens 100 comprises a power coil configured to receive power wirelessly from an external device. In some embodiments, the external device is an accessary device worn by the user, such as a necklace, headband, glasses, or other wearable device. In other embodiments, the external device is an electronic device such as a mobile phone. In some embodiments, the scleral contact lens 100 may be powered by one or more batteries within the contact lens, and may interface with an external device for performing certain processing functions. In some embodiments, the external device may be configured to communicate with a remote server (e.g., a cloud server).

Figure 1B:
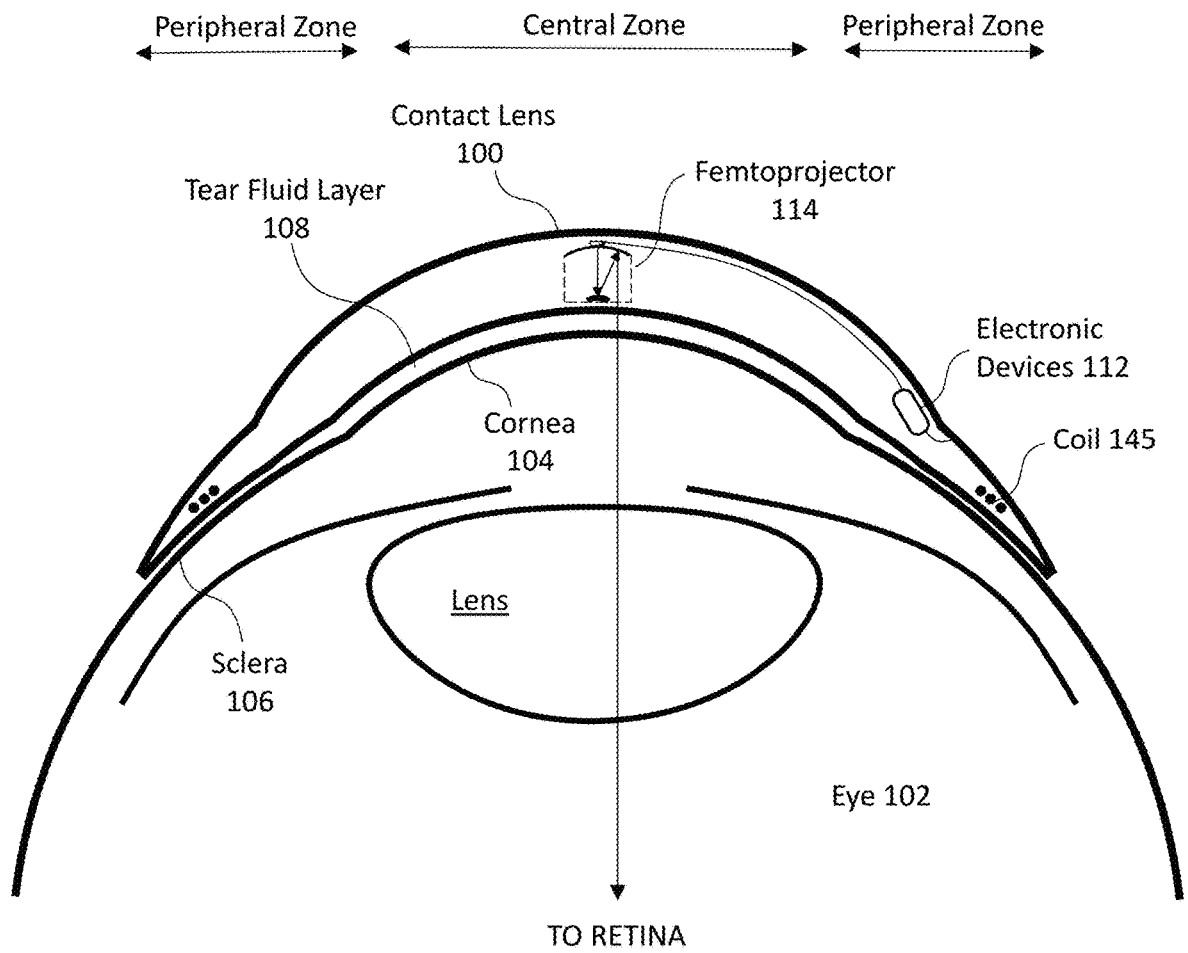
FIG. 1B shows a cross sectional view of the scleral contact lens display mounted on the user's eye, in accordance with some embodiments.

FIG. 1B shows a cross sectional view of the scleral contact lens mounted on the user's eye, in accordance with some embodiments. Scleral contact lenses are designed to be mounted on the sclera of the user's eye such that they do not move around on the wearer's eye when worn. The eye 102 includes a cornea 104 and a sclera 106. The scleral contact lens 100 is supported by the sclera 106 and vaults over the cornea 104, typically forming a tear fluid layer 108 between the contact lens 100 and the cornea. Oxygen permeates through the contact lens 100 and tear fluid layer 108 to the cornea 104, at a rate depending upon the geometry of the contact lens 100 and the oxygen transmissibility and thicknesses of the materials that form the contact lens 100 (not shown in this figure).

The contact lens 100 contains payload(s). These payloads may not be gas-permeable and also may require the contact lens to have a thickness and structural strength sufficient to accommodate and support the payloads. As a result, the approach used in soft contact lenses for corneal oxygenation typically will not be adequate for contact lens 100. In some embodiments, the payload(s) may include electronics, including electronics that require a power source such as a battery or a coil that is inductively powered. In the example of FIG. 1B, the payloads include a small projector that projects images onto the wearer's retina (referred to as a femtoprojector 114), and the corresponding electronics 112 to operate the femtoprojector. In some embodiments, both of these are powered by a coil 145 around the periphery of the contact lens. In other embodiments, the femtoprojector 114 and electronics 112 may be powered by a battery located within the contact lens 100 (not shown).

The femtoprojector 114 may include an LED frontplane with an LED array, an ASIC backplane with electronics that receives the data to drive the LED frontplane, and optics to project light from the LED array onto the retina. The femtoprojector 114 preferably fits into a 2 mm by 2 mm by 2 mm volume or even into a 1 mm by 1 mm by 1 mm volume. The contact lens 100 must be sufficiently thick and structurally sound to support the femtoprojector 114 and electronics 112, while still maintaining adequate oxygen flow to the cornea.

To allow the femtoprojector 114 to project images onto the user's retina, the femtoprojector 114 may be positioned over the cornea. On the other hand, the electronics 112 may be positioned away from the cornea, as shown in FIG. 1B. For convenience, the contact lens 100 is divided into a central zone and a peripheral zone. The central zone may refer to an area of the contact lens that overlaps the cornea 104 of the eye 102, while the area of the contact lens outside the cornea is referred to as the peripheral zone. As illustrated in FIG. 1B, the femtoprojector 114 is located within the central zone of the contact lens, while the electronics 112 and coil 145 are located in the peripheral zone. People have eyes of different sizes and shapes. The diameter of the boundary between the cornea and the sclera is typically between 10 and 12.5 mm, so for convenience, the central zone may be defined as the 10 mm diameter center area of the contact lens (i.e., within 5 mm radius of the center axis of the contact lens). Payload components that project light onto the retina typically will be located within the central zone due to the required optical path. Conversely, payload components that do not project light onto the retina or otherwise interact with the retina may be located on the edge of the central zone or outside the central zone so that they do not block light from reaching the retina.

Other examples of powered payloads include sensors, imagers, and eye tracking components such as accelerometers, gyroscopes and magnetometers. Payloads may also include passive devices, such as a coil or antenna for wireless power or data transmission, capacitors for energy storage, and passive optical structures (e.g., absorbing light baffles, beam-splitters, imaging optics). The contact lens 100 may also contain multiple femtoprojectors, each of which projects images onto the user's retina. Because the contact lens 100 moves with the user's eye 102 as the user's eye rotates in its socket, the femtoprojectors mounted in the contact lens 100 will also move with the user's eye and project to the same region of the retina. Some femtoprojector(s) may always project images to the fovea, and other femtoprojector(s) may always project images to more peripheral regions which have lower resolutions. As a result, different femtoprojectors may have different resolutions. The images from different femtoprojectors may be overlapping, to form a composite image on the wearer's retina. Contact lens having one or more femtoprojectors may hereafter referred to as "contact lens displays" or "eye mounted displays."

Figure 1C:
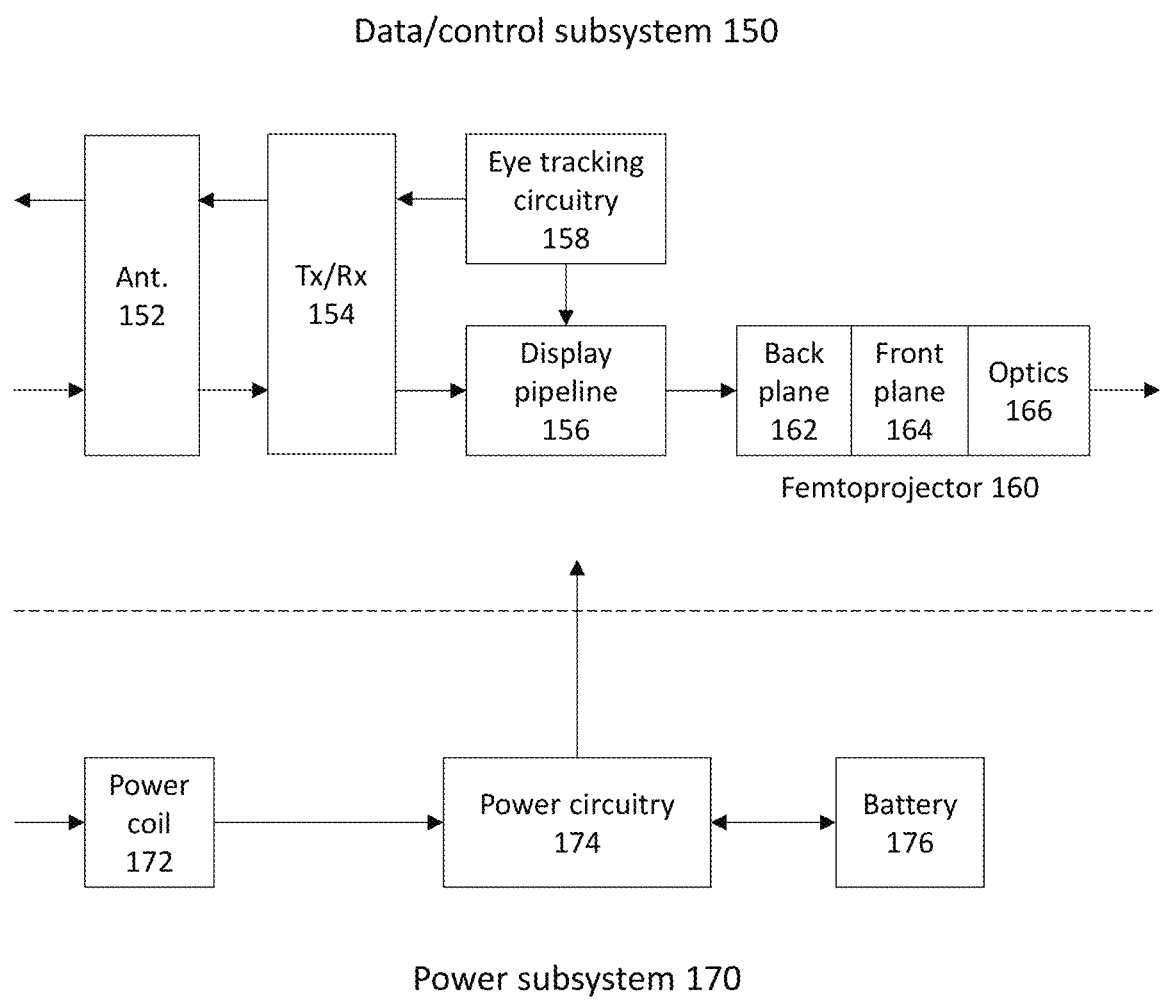
FIG. 1C is a functional block diagram of an eye-mounted display using a scleral contact lens.

FIG. 1C is a functional block diagram of an eye-mounted display using a scleral contact lens, in accordance with some embodiments. The display can be divided into a data/control subsystem 150 and a power subsystem 170. In some embodiments, the receive path of the data/control subsystem 150 includes an antenna 152, receiver circuitry 154, a data pipeline 156, and a femtoprojector 160. Data from an external source (e.g., an external device such as an accessory device) is wirelessly transmitted to the display via the antenna 152. The receiver circuitry 154 performs the functions for receiving the data, for example demodulation, noise filtering, and amplification. It also converts the received signals to digital form. The pipeline 156 processes the digital signals for the femtoprojector 160. These functions may include decoding, and timing. The processing may also depend on other signals generated internally within the contact lens, for example eye tracking 158 or ambient light sensing. The femtoprojector 160 then projects the corresponding images onto the wearer's retina. In this example, the femtoprojector 160 includes a CMOS ASIC backplane 162, LED frontplane 164 and optics 166, as described previously.

The data/control subsystem 150 may also include a back channel through transmitter circuitry 154 and antenna 152. For example, the contact lens may transmit eye tracking data, control data and/or data about the status of the contact lens.

In some embodiments, power is received wirelessly via a power coil 172. This is coupled to circuitry 174 that conditions and distributes the incoming power (e.g., converting from AC to DC if needed). The power subsystem 170 may also include energy storage devices, such as batteries 176 or capacitors (not shown), in addition to or instead of the power coil 172. For example, in some embodiments, the power coil 172 is used to charge the battery 176, which distributes power to the components of the data/control subsystem 150. In some embodiments, the contact lens may comprise the battery 176 but no power coil 172, or vice versa.

In addition to the components shown in FIG. 1C, the overall system may also include components that are outside the contact lens (i.e., off-lens). For example, head tracking and eye tracking functions may be performed partly or entirely off-lens (e.g., sensor within the contact lens may transmit raw sensor data to an external device, which analyzes the received data to calculate a head or eye orientation). The data pipeline may also be performed partially or entirely off-lens. Each of the arrows on the left-hand side of FIG. 1C also connects to an off-lens component. The power transmitter coil is off-lens, the source of image data and control data for the contact lens display is off-lens, and the receive side of the back channel is off-lens.

There are many ways to implement the different system functions. Some portions of the system may be entirely external to the user, while other portions may be worn by the user in the form of a headpiece or glasses. Components may also be worn on a belt, armband, wrist piece, necklace, or other types of packs. For example, in some embodiments, the contact lens may receive image content to be displayed by the femtoprojector 160 from an external device associated with the user via the antenna 152. The external device may further communicate with a server (e.g., a remote server) to generate the image content.

FIG. 2 is a simplified perspective view of a scleral contacts lens able to accommodate a thick payload, where the contact lens is configured to be mounted on the user's eye, in accordance with some embodiments. In some embodiments, a thick payload may refer to a payload greater than 500 um in thickness. With respect to the contact lens, terms such as "outer" "over" "top" and "up" refer to the direction away from the wearer's eye, while "inner" "under" "bottom" and "down" refer to the direction towards the wearer's eye. The scleral contact lens 200 includes a core 210 that carries the payload(s). The core 210 has a base surface 216 that mounts to the sclera of the eye, an outer surface 212 that faces outwards towards the external environment, and an inner surface 213 that faces inwards towards the cornea of the eye. The contact lens 200 also includes an outer covering 220 that covers the outer surface 212 of the core, and an inner covering 230 that covers the inner surface 213 of the core. Each covering 220, 230 forms a corresponding air cavity 225, 235 between the covering and the core 210. An air path 240 through the core 210 connects the two cavities 225, 235.

Together, the outer covering 220, core 210, and inner covering 230 form a three-layer contact lens 200. The outer covering 220, core 210, and inner covering 230 are shaped such that when the contact lens is assembled, an outer cavity 225 is formed between the outer covering 220 and the core 210, and an inner cavity 235 is formed between the core 210 and the inner covering 230. Because the outer and inner cavities 225 and 235 are each entirely enclosed by their respective structures, the cavities are not directly exposed to the external environment, preventing any debris or other contaminants from the outside air or from the tear layer from potentially reaching either cavity.

The outer covering 220 is exposed to air or separated from air by a thin tear layer that forms over the covering. As such, oxygen diffuses from the surrounding air through the gas permeable material of the outer covering 220 (and thin tear layer) to reach the outer cavity 225. The oxygen in the outer cavity 225 diffuses through an air path 240 to traverse through the thickness of the core 210 to reach the inner cavity 235. From the inner cavity 235, oxygen diffuses through the gas permeable material of the inner covering 230 to reach the tear fluid layer and underlying cornea of the wearer. Because the inner cavity 235 may cover all or most of the wearer's cornea, oxygen may be distributed evenly across the wearer's cornea through the inner covering 230. In some embodiments, one or more surfaces the outer covering and/or the inner covering may be covered with a coating of hydrophilic material, to make the contact lens more comfortable to wear (e.g., by improving lubricity of the contact lens) and/or to preserve gas permeability of the coverings. In some embodiments, portions of the core not covered by the outer and inner coverings (such as the exposed portions of the outer surface of the core) are covered with a coating of hydrophilic material, to increase wearer comfort by improving lubricity.

Oxygen diffusion through the air (such as in the cavities 225, 235 and air path 240) is roughly 100,000 times more rapid than diffusion through permeable solids such as rigid gas permeable ("RGP") plastic. As a result, the oxygen transmissibility of the contact lens 200 is defined primarily by the thicknesses and materials of the two coverings 220, 230, and not by the thickness of the cavities 225, 235, air path 240, or the core 210. The oxygen transmissibility "Dk/t" of the entire contact lens 200 may be approximated based upon the Dk/t of the areas of the outer covering 220 and inner covering 230 overlapping the outer cavity 225 and inner cavity 235, respectively, and not on the thickness or material of the core 210. The thickness and material of the core 210 may be selected to accommodate a desired payload and provide sufficient structural strength to support the payload. Here, Dk is oxygen permeability, where D is a diffusion constant measured in $$\left(\frac{cm^2}{sec}\right),$$

and k is a concentration of $O_2$ per unit of $O_2$ partial pressure and is measured in $$\left(\frac{ml_{O_2}}{ml}\right)\left(\frac{1}{mmHg}\right).$$

The t is thickness of the material. Dk/t is often quoted in units of $10^{-11}$ $$\left(\frac{cm^2}{sec}\right)\left(\frac{ml_{O_2}}{ml}\right)\left(\frac{1}{mmHg}\right).$$

Some sources recommend an oxygen transmissibility of Dk/t=24 as the minimum for daily wear contact lenses, and an oxygen transmissibility of Dk/t=87 as the minimum recommended for extended wear lenses in contact with the cornea.

In FIG. 2, the inner covering 230 and inner cavity 235 are large enough to cover substantially all of the cornea. In this way, oxygen can diffuse from the cavity 235 through the inner covering 230 directly to all parts of the cornea. Lateral diffusion through the inner covering 230 or tear layer is generally not required. To accommodate typical corneas, the inner covering 230 and inner cavity 235 each have a circular edge of at least approximately 10-13 mm in diameter.

For the outer covering 220 and outer cavity 225, the location is less important than the overall surface area exposed to ambient oxygen. In some designs, the outer structure 220, 225 has a same surface area as the inner structure 230, 235. That is, in FIG. 2, the overlap area between the outer covering 220 and outer cavity 225 is at least equal to the overlap area between the inner covering 230 and inner cavity 235.

The air path 240 in FIG. 2 is a single air shaft through a solid section of the core 210, for example a 1 mm diameter air shaft. Because oxygen diffusion in air is high, the specific shape and location of the air path 240 is secondary in importance, so long as it connects the two cavities 225, 235. For example, the air path may be implemented as two or more air shafts instead of one air shaft. It may also be located in a periphery of the contact lens, for example outside a 10 mm diameter central zone, so that it does not interfere with light entering the eye.

The coverings 220, 230 are each relatively thin in comparison to the core 210 and are made of materials that are permeable to oxygen such as rigid gas permeable ("RGP") plastic. On the other hand, the core 210 is sufficiently thick to accommodate the payloads, such as femtoprojectors and electronic components. The core 210 may also be made from an oxygen permeable material such as RGP, or from an oxygen impermeable material such as poly(methyl methacrylate) ("PMMA"). The approach described above may also be used when the core 210 does not contain a payload, but is so thick that it would have insufficient oxygen transmission. In some embodiments, the outer covering 220, core 210, and inner covering 230 are bonded to each other via an adhesive. Suitable adhesives may include glues such as medical grade optical cement. Example glues that may be appropriate for this application include UV-curable optical adhesives from Henkel Loctite.

In some embodiments, such as in the design shown in FIG. 2, the core 210, rather than the inner covering 230, makes contact with the sclera through the base surface 216. This provides additional space in the core to accommodate payloads, compared to designs in which the core does not extend all the way to the sclera. This approach may also provide more payload space located close to the perimeter of the contact lens. For example, a coil may be located closer to the perimeter, resulting in a larger area coil and more efficient power transfer. The core 210 material is also a good structural material to support the payloads.

In some embodiments, the outer covering 220 has an annular shape and does not cover a center area of the contact lens. Because the outer covering 220 does not extend to the center of the core 210, the outer covering 220 does not contribute to the total thickness at the center of the contact lens 200. As a result, the contact lens 200 has a reduced thickness in comparison to a contact lens having an outer covering that also covers the center of the core. In addition, if the center hole of the outer covering 220 is large enough (e.g., 8 mm diameter or larger), it will not interfere with light passing through the contact lens to reach the wearer's eye, eliminating potential optical reflection or scattering that may occur at the boundaries between the outer covering 220, the outer cavity 225, and the core 210. Furthermore, an annular outer covering 220 may be more durable and more easily supported by the core 210 in comparison to one that must be supported over the entire center area of the contact lens. Thus, the outer covering 220 can be made thinner while still maintaining structural integrity, which increases the oxygen transmission through the outer covering.

In addition, both coverings 220, 230 are flush with the core 210. The outer surface 212 of the core has a recess for the outer covering 220, so that the outer covering and the core's adjoining outer surface 212 form a smooth surface. Because the eyelid blinks over the contact lens, a smooth outer surface is more comfortable, as well as providing an overall thinner contact lens as described above. The inner surface 213 of the core also has a recess for the inner covering 230, also resulting in a smooth surface between the two.

While the outer covering 220 is illustrated in FIG. 2 as a single annular piece, in some embodiments, the outer covering may be composed of several separate pieces. When placed over the core, each of the outer covering pieces forms a separate outer cavity between it and the core, each of which is connected to the inner cavity via a respective air path. In some embodiments, each of the outer covering pieces may be separated by a space when placed over the core, while in other embodiments, the outer covering pieces directly abut each other when placed over the core. Using separate pieces for the outer covering can reduce the mechanical stress on each piece.

In some embodiments, the scleral contact lens may be oval in shape. The contact lens may have a non-circular perimeter that extends below the upper and lower eyelids when mounted on the user's eye (e.g., an "oval" perimeter that is elongated along the direction of the eye opening). Due to the curvature of the eye, the actual shape of the perimeter is three-dimensional. However, for convenience, it will be referred to as oval. Due to the size of the contact lens, it is partially covered by the user's eyelids. One advantage of a non-circular perimeter is that the contact lens may be larger and has more space to carry payloads. Another advantage is that the perimeter is larger so that larger coils (e.g., coil 145) may be used. For example, the coil 145 may comprise a conductive coil constructed so that it lies parallel to and within 0.3 mm to 3 mm of the oval perimeter of the contact lens. Although the contact lens is larger with a non-circular perimeter, in some embodiments, the inner covering and inner cavity may have the same circular size and shape as described previously since that is sufficient to oxygenate the cornea.

As discussed above, the amount of oxygen that is able to flow from the outside environment to reach the user's cornea is dependent on the structure and material of the outer and inner coverings. In some embodiments, in order to facilitate oxygen flow, at least one of the inner covering, the outer covering, and the core is formed to have a patterned structure of varying thicknesses, such as a pattern of recesses interspersed with supports. The patterned structure may be formed on an inner surface of the outer covering, on an outer surface of the inner covering, on a portion of the outer surface of the core facing the outer covering, or on a portion of the inner surface of the core facing the inner covering. For ease of discussion, FIGS. 3 and 4 below show the patterned structure as being formed on the inner surface of the outer covering. In such an arrangement, the core and outer covering contact each other at the supports of the patterned structure, while the recesses of the patterned structure form the cavity between the core and outer covering, allowing for oxygen flow from the external environment to pass through the outer covering to the cavity. Because each recess spans only a short distance between supports, the outer covering may be made thinner without compromising structural integrity.

Figure 3A:
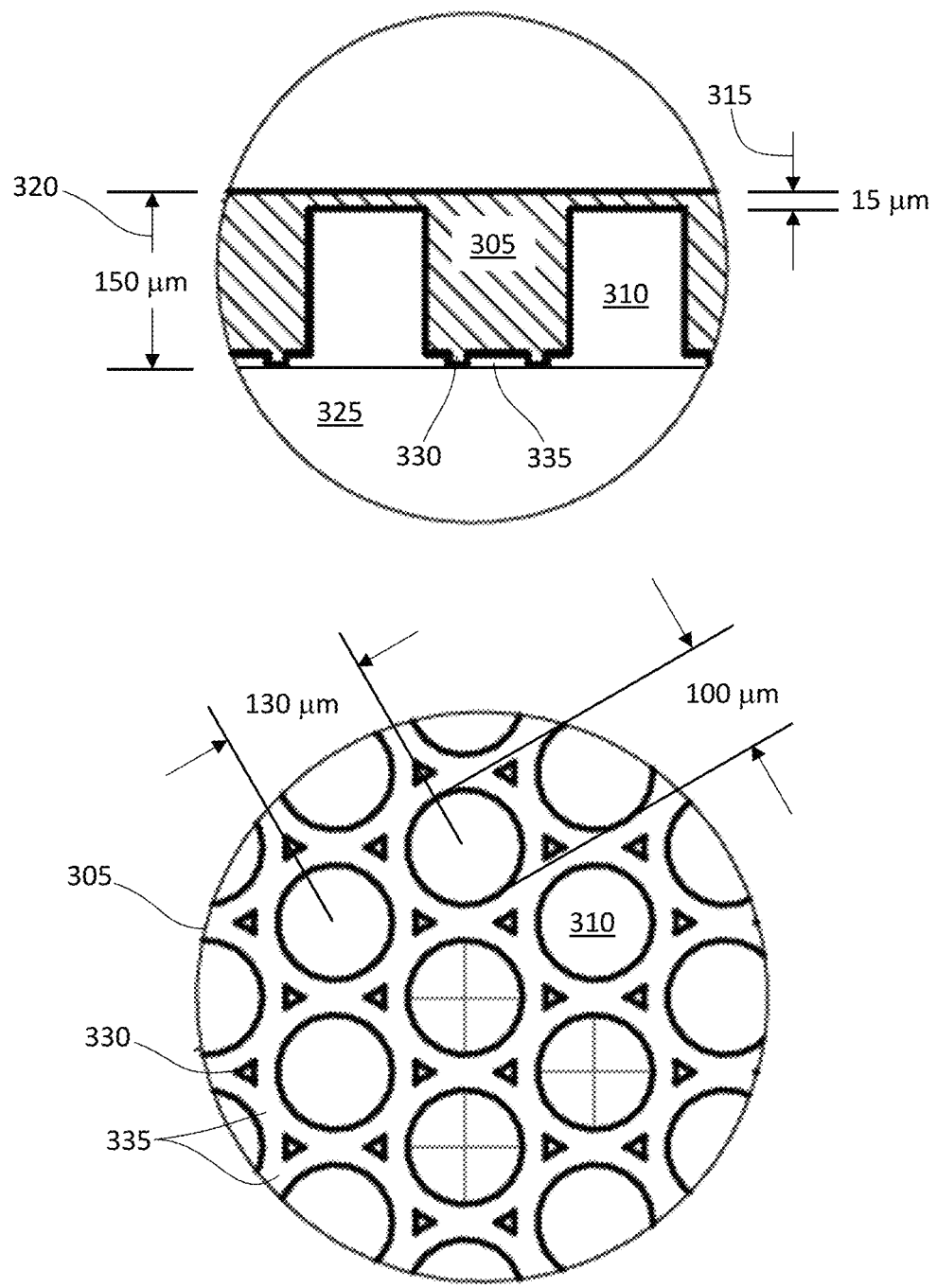
FIG. 3A shows a side and a top-down view of a patterned structure formed on the outer covering of a scleral contact lens, in accordance with some embodiments.

In some embodiments, the patterned structure comprises a pattern of blind holes. FIG. 3A shows a side and a top-down view of a patterned structure formed on the outer covering of a scleral contact lens, in accordance with some embodiments. As illustrated in FIG. 3A, a pattern of blind holes 310 are formed on an inner surface of the outer covering 305 of the scleral contact lens. In this example, the maximum thickness 320 of the outer covering 305 is 150 um (microns). Each of the blind holes 310 creates a recess within the outer covering 305 where the outer covering has a reduced thickness 315 (15 um in this example). In some embodiments, the reduced thickness 315 of the outer covering corresponding to the recesses defined by the blind holes 310 is significantly smaller than the maximum thickness 320 of the outer covering (e.g., 10% of the maximum thickness). For example, in some embodiments, the outer covering (prior to forming of the patterned structure) may have a thickness of approximately 150 um, while the thickness of the outer covering within the recesses may be approximately 15 um. It is understood that any specific dimensions discussed herein are used solely for purpose of example, and that patterned structures and contact lens components may have dimensions other than those discussed herein.

The patterned structure is formed such that when the outer covering 305 is placed over the core 325, portions of the outer covering 305 between each of the blind holes 310 will contact the outer surface of the core 325. As such, each portion of reduced thickness of the outer covering 305 (defined by the blind holes 310) spans only a short distance over the core 325. This allows for the thickness of outer covering 305 within the recesses to be reduced, while still maintaining structural integrity.

In some embodiments, one or more pillars 330 are formed on the portions of the outer covering 305 between the blind holes 310. When the outer covering 305 is placed over the core 325, the pillars 330 function to support the outer covering 305 on the core 325, as well as space a portion of outer covering 305 between the blind holes 310 away from the core 325. This space between the pillars 330 defines the air cavity 335 connecting adjacent blind holes 310 and allowing air to flow between them. The blind holes 310 and their connecting channels 335 thus collectively form a single cavity between the outer covering 305 and the core 325, allowing oxygen passing through the outer covering 305 at the location of any of the blind holes 310 to reach an air passage(s) within the core (e.g., air path 240) and the inner cavity.

In some embodiments, the blind holes 310 are formed in a hexagonal pattern, where each of the blind holes 310 is surrounded by six adjacent blind holes. In addition, as illustrated in FIG. 3A, each pillar 330 may be located between three adjacent blind holes 310. In other embodiments, the blind holes 310 may be formed in a rectangular pattern or other type of pattern. In some embodiments, the blind hole pattern of the patterned structure is configured such that a distance between pillars 330 in the patterned structure does not exceed 1 mm.

In some embodiments, the blind hole pattern illustrated in FIG. 3A is formed using a plurality of overlaid blind hole patterns, e.g., a first blind hole pattern comprising blind holes of a first radius and a first depth, and a second blind hole pattern comprising blind holes of a second radius and a second depth. In some embodiments, the first and second blind hole patterns are aligned, such that the blind holes of the first and second blind hole patterns share central axes. As such, the spacing of the blind holes of the first blind hole pattern is the same as the spacing of the blind holes of the second blind hole pattern.

Figure 3B:
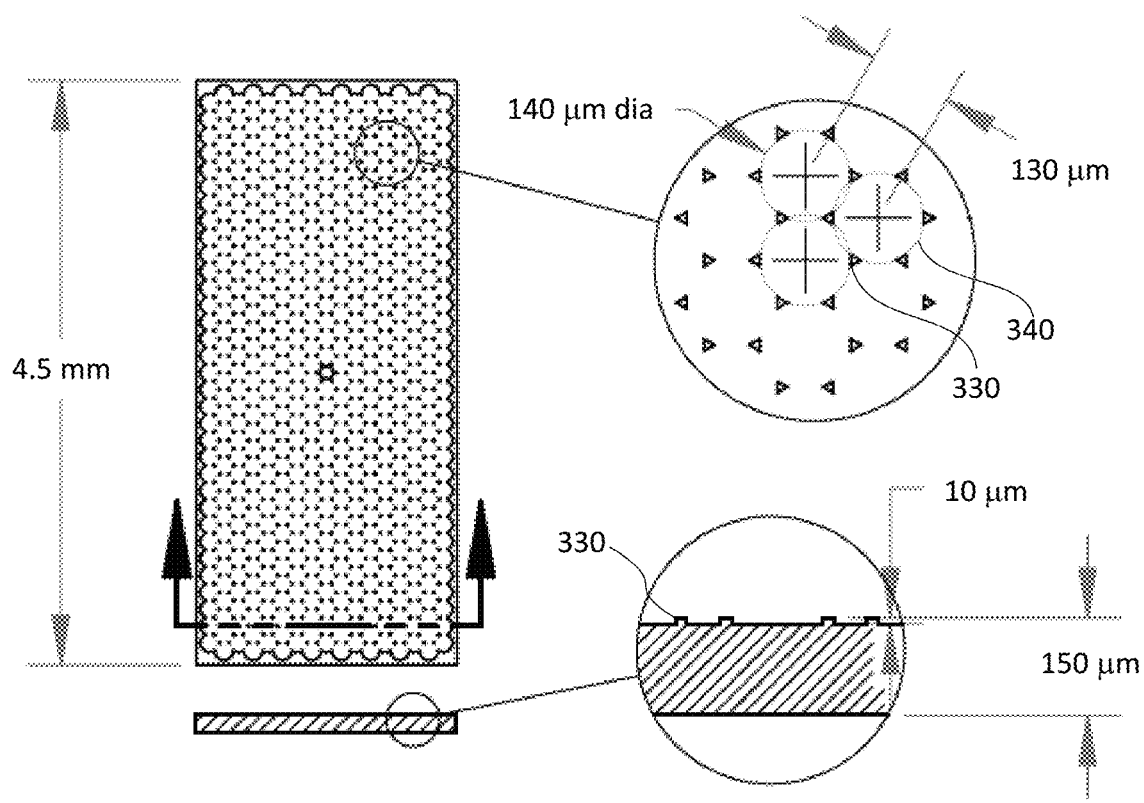
FIG. 3B shows views of a first portion of the patterned structure of FIG. 3A formed on the outer covering of the scleral contact lens.

Examples of the use of first and second overlaid blind hole patterns to create the overall pattern are discussed in relation to FIGS. 3B and 3C below. FIG. 3B shows views of a first step in forming the patterned structure of FIG. 3A. In this first step, large overlapping blind holes 340 of shallow depth are cut into the outer covering, thus creating the pillars 330. The depth corresponds to a desired height of the pillars 330. Because oxygen diffusion through the air (e.g., within the channels 335 formed between the pillars 330) is roughly 100,000 times more rapid than diffusion through permeable solids (such as that used to form the outer covering 305), the height of each pillar 330 (and the height of the resulting channels 335 formed between them) may be small compared to the total thickness of the outer covering 305 (e.g., between 5-10% of the thickness of the outer covering). This allows for the pillars 330 to more stably support the outer covering 305 on the core 325, while the channels 330 will still provide sufficient air flow between the blind holes 310.

The radius of these blind holes is selected to be greater than the spacing between the blind holes, such that the blind holes 340 will partially overlap when formed on the outer covering 305. However, the radius is selected such that material is left between adjacent blind holes to form the pillars 330. For example, in a hexagonal blind hole pattern, such as that illustrated in FIG. 3B, each pillar 330 is defined by the material left between three adjacent blind holes 340. Consequently, each blind hole 340 forms six pillars corresponding to the material left between it and its six adjacent blind holes. In this example, the blind holes cover a 4.5 mm wide swath of the outer covering.

Figure 3C:
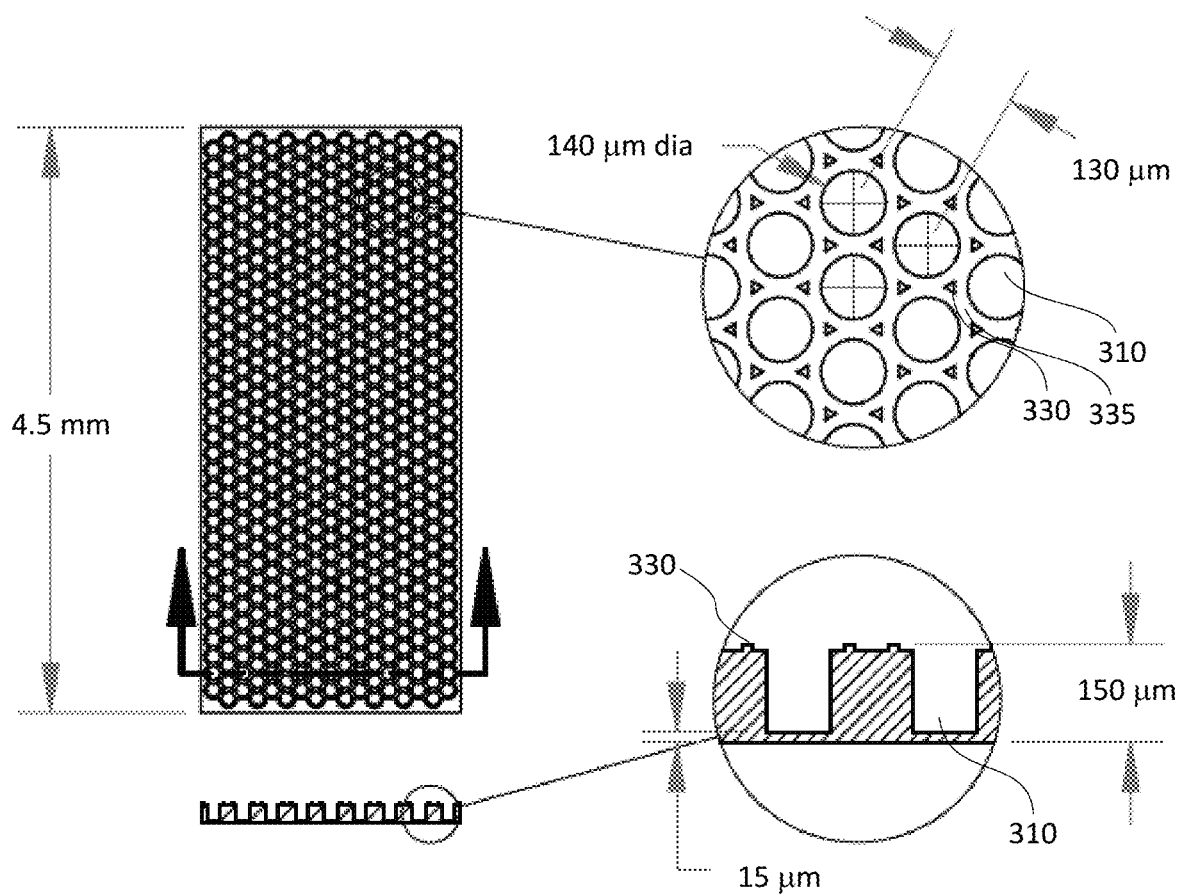
FIG. 3C shows views of a second portion of the patterned structure of FIG. 3B formed on the outer covering of the scleral contact lens.

FIG. 3C shows views of a second step in forming the patterned structure of FIG. 3A. Here, a second blind hole 310 pattern is formed on the outer covering 305 after the formation of the first blind hole pattern of FIG. 3B. While the first blind hole pattern defines the pillars 330, the second blind hole pattern defines the recesses of the outer covering 305. In some embodiments, each of the blind holes of the second blind hole pattern is aligned with a central axis of a corresponding blind hole 340 of the first blind hole pattern (e.g., such that the blindhole 310 is centered between a set of pillars 330 formed by the first blind hole pattern). The depth of these blind holes 310 is selected based upon desired reduced thickness 315 of the outer covering within the recessed regions of the patterned structure.

Consequently, after both the first and second blind hole patterns have been formed on the outer covering 305, the surface of the outer covering 305 will comprise a plurality of recesses (e.g., defined by the blind holes 310 of the second blind hole patterns) where the thickness of the outer covering is greatly reduced, positioned between supports having pillars 330 where the outer covering 305 is supported by the core 325. Because the rate at which air (including oxygen) is able to pass through the outer covering is inversely proportional to the thickness of the outer covering, oxygen transmission through the outer covering 305 at the recesses is greatly increased due to the reduced thickness 315 of the outer covering. Oxygen may pass between different blind holes 310 via the passages 335 formed by spaces between the pillars 330, connecting the blind holes 310 of the patterned structure to collectively form a single cavity between the outer covering and core of the contact lens. Oxygen can thus pass through the gas permeable material of the outer covering from the external environment to the recesses defined by the blind holes, and flow between the blind holes to reach an air passage through the core (e.g., the air path 240 illustrated in FIG. 2) to the inner cavity, where it may then pass through the inner covering to oxygenate the user's cornea.

Although FIGS. 3B and 3C illustrate the second blind hole pattern formed after the first blind hole pattern, it is understood that in other embodiments, the first and second blind hole patterns may be formed in a different order.

In addition, although FIGS. 3A-3C illustrate the blind holes of the patterned structure as cylindrical blind holes, it is understood that in some embodiments, the patterned structure may comprise a blind hole pattern in which the blind holes are of a different shape. For example, in some embodiments, the patterned structure comprises a blind hole pattern in which each blind hole is shaped as a frustum, in which a size of the blind hole decreases with depth within the outer covering, i.e., from a first, larger size at the surface of the outer covering on which the blind hole is formed, to a second, smaller size at the maximum depth of the blind hole. In some embodiments, the first and second sizes are selected such that the blind holes will partially overlap up to a certain depth. Material left in non-overlapping regions between adjacent blind holes function as pillars to support the outer covering on the core, while gaps formed by areas of overlap between adjacent blind holes form passages allowing for air flow between the blind holes of the pattern.

Because the patterned structure allows for portions of the outer covering to be greatly reduced in thickness (e.g., ~10% compared to an original thickness of the outer covering), an overall surface area of the outer covering required to achieve a desired level of oxygen transmission may be reduced, due to oxygen transmissibility being directly proportional to surface area and inversely proportional to thickness of the outer covering.

Figure 4A:
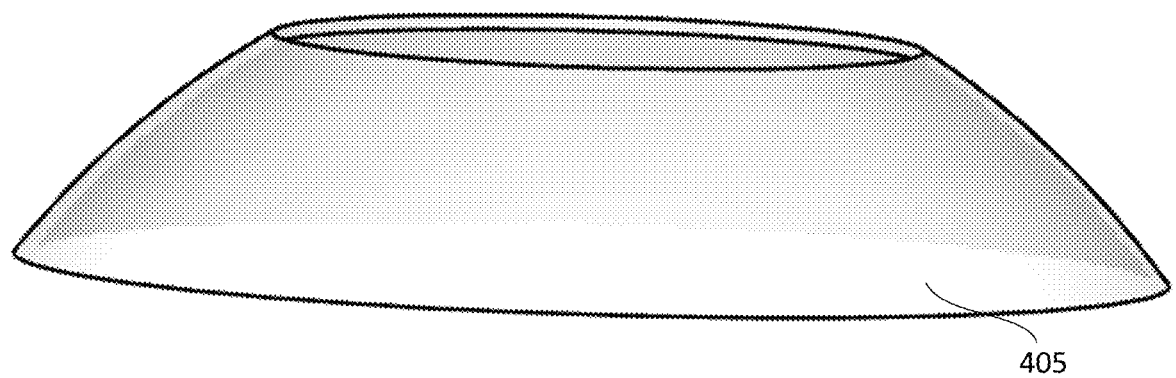
FIG. 4A shows a perspective view of an outer covering of a scleral contact lens having a substantially uniform thickness, in accordance with some embodiments.

FIG. 4A shows a perspective view of an outer covering of a scleral contact lens having a substantially uniform thickness, in accordance with some embodiments. The outer covering 405, when mounted on the core of a contact lens, may contact the core only at the edges of the outer covering, and define an outer cavity between an inner surface thereof and an outer surface of the core having a substantially uniform thickness. To maintain a desired level of structural integrity, the outer covering may need to have at least a minimum thickness. In addition, to achieve a desired level of oxygen transmission, the outer covering 405 may need to have at least a particular surface area for a given thickness. For example, in some embodiments, the outer covering may have a thickness of 150 um and cover a surface area of 140 $mm^2$ on the core to achieve a desired oxygenation level.

Figure 4B:
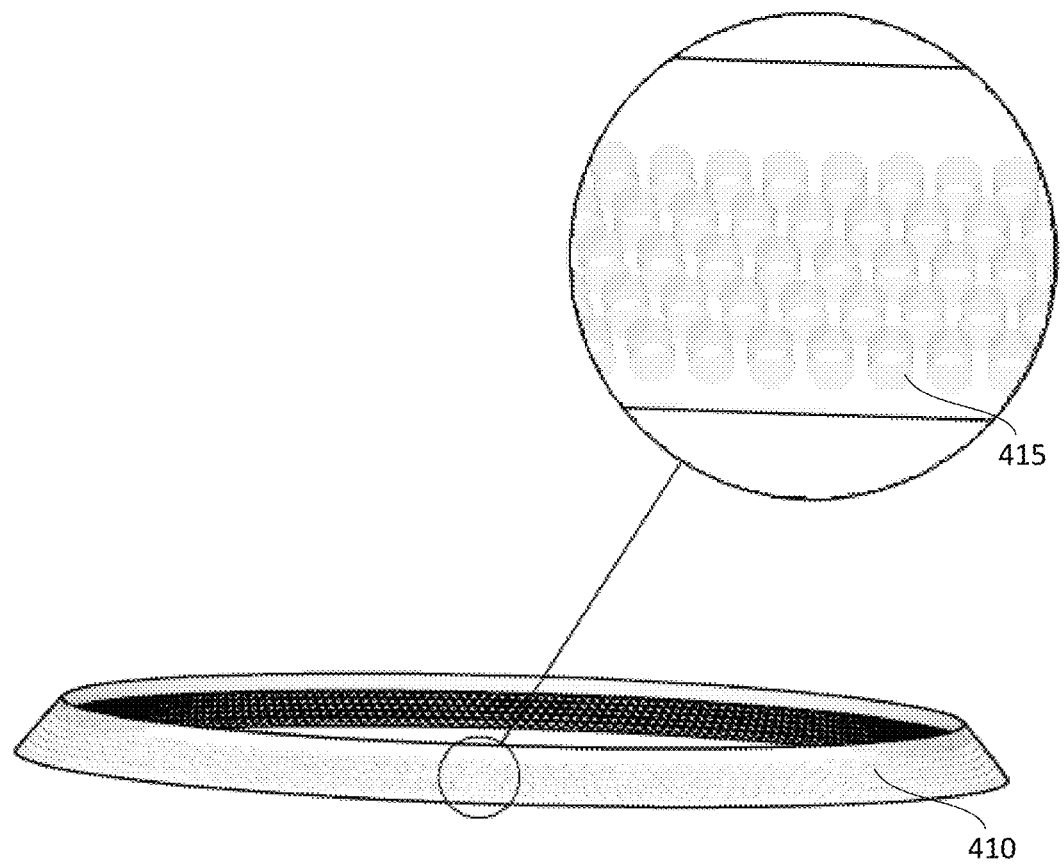
FIG. 4B shows a perspective view of an outer covering of a scleral contact lens having a patterned structure formed thereon, in accordance with some embodiments

FIG. 4B shows a perspective view of an outer covering of a scleral contact lens having a patterned structure formed thereon, in accordance with some embodiments. The patterned structure 415 formed on the outer covering 410 may comprise the overlaid blind hole pattern such as that illustrated in FIGS. 3A-3C (e.g., first and second overlaid blind hole patterns forming a plurality of blind holes and pillars between adjacent blind holes). The patterned structure 415 of the outer covering 410 creates intermittent points of support (e.g., at the pillars 330 illustrated in FIGS. 3A-3C) between the outer covering 410 and the core when outer covering 410 is assembled on the core. Because the recessed regions of patterned structure 415 formed in the outer covering 410 have reduced thickness, the amount of oxygen transmission of the outer covering 410 for a given surface area may be increased. As an example, if the recesses of the patterned structure cover 50% of the outer covering and are 80% thinner than the thickness of FIG. 4A, then an amount of oxygen transmission for a given surface area may be increased by at least $$\frac{50\%}{(1-80\%)} - 1 = 150\%.$$

As such, a total surface area of the core that is covered by the outer covering may be reduced. For example, the outer covering 410 illustrated in FIG. 4B (having a patterned structure 415 formed thereon) may have a reduced surface area in comparison to the outer covering 405 illustrated in FIG. 4A (having substantially uniform thickness), but may still be able to provide a similar amount of oxygen transmission to the outer cavity of the contact lens. In some, the outer covering 410 has an annular shape with a width of 3 mm or less. If the patterned structure increases the oxygen transmission by 150% (i.e., 2.5× the oxygen transmission in FIG. 4A), then the surface area can be 40% of the surface area in FIG. 4A and still maintain the same oxygen transmission. In some embodiments, the patterned structure is configured such that the recesses of the patterned structure occupy at least a threshold percentage (e.g., >50%) of an overall area of the patterned structure, to ensure that the benefit to oxygen transmissibility from having a reduced thickness of the outer covering at the recesses offsets the reduction in transmissible surface area due to contact between the inner covering and core at the supports. In some embodiments, the outer covering may be configured to have, within the area of the patterned structure, an average thickness of less than 100 um, and cover an area on the contact lens of not more than 100 mm². In some embodiments, the patterned structure is configured to cover at least a threshold amount of the outer covering (e.g., at least ⅓ of an overall area of the outer covering). Reducing a surface area of the core covered by the outer covering may allow for additional flexibility regarding placement of various components and payloads on the core (e.g., outer covering, payload components such as electronic components, power coils, etc.).

While the above discussion refers primarily to embodiments where the patterned structure comprises a pattern of blind holes, it is understood that the patterned structure may comprise any type of structure that defines a plurality of recesses interspersed between a plurality of supports. For example, in some embodiments, the patterned structure may comprise a plurality of grooves formed on the inner surface of the outer covering. Regions of the outer covering between the formed grooves define ridges that support the outer covering when placed on the core, while the grooves define recesses where the outer covering is of reduced thickness, facilitating oxygen transmission from the outside environment into the grooves. In some embodiments, the plurality of grooves are connected to each other by one or more passages, allowing for air flow between the grooves. For example, in embodiments where the outer covering is annular in form (e.g., as illustrated in FIGS. 2 and 4B), the patterned structure may comprise a plurality of circumferential grooves formed on the outer covering, with one or more additional grooves oriented orthogonally to the circumferential grooves to form passages connecting the circumferential grooves.

In some embodiments, the patterned structure is formed on an outer surface of the core instead of an inner surface of the outer covering. For example, the patterned structure may comprise a plurality of circumferential grooves formed on an outer surface of the core, whereas the outer covering may be of substantially uniform thickness. When mounted on the core, the ridges between pairs of adjacent grooves on the core directly contact an inner surface of the outer covering, functioning as supports for the outer covering, while the space between the inner surface of the outer covering and the grooves with the core form the outer cavity. In some embodiments, the outer covering is formed to be of substantially uniform thickness. However, due to being periodically supported by the patterned structure formed on core, the thickness of the outer covering may be reduced compared to an outer covering that is supported only at its edges.

In some embodiments, forming the patterned structure on the outer surface of the core instead of on an inner surface of the outer covering may improve oxygen transmissibility. Because the outer covering can be formed to be of a reduced uniform thickness, as the supports which would correspond to areas of increased thickness of the outer covering are formed on the core instead of on the outer covering, the impact of the supports on oxygen transmissibility is reduced. In addition, in some embodiments, the supports of the patterned structure formed on core may be rounded, pointed, or otherwise shaped to reduce a contact area with the outer covering, increasing an amount of surface area of the outer covering that contributes to oxygen transmission. In some embodiments, the outer covering over the patterned structure formed on the core may have an average thickness of not more than 100 um.

Due to the outer covering contacting the core at the supports of the patterned structure when the outer covering is mounted to the core, the portions of the outer covering having reduced thickness (e.g., recesses) will only span a short distance (e.g., corresponding to a distance between supports). However, prior to the outer covering being assembled on the core, these portions of reduced thickness may cause the outer covering to be difficult to handle, due to lack of support from the core leading to potential folding or breakage of the outer covering.

In some embodiments, instead of forming the core and outer covering to their final desired thicknesses, the outer covering and/or the core are initially formed as an outer covering component and/or core component having a larger thickness, which is then cut down to the desired thickness after assembled together. This may help to ensure that the outer covering is thick enough to handle prior to being mounted on (and thus receiving support from) the core.

Figure 5A:
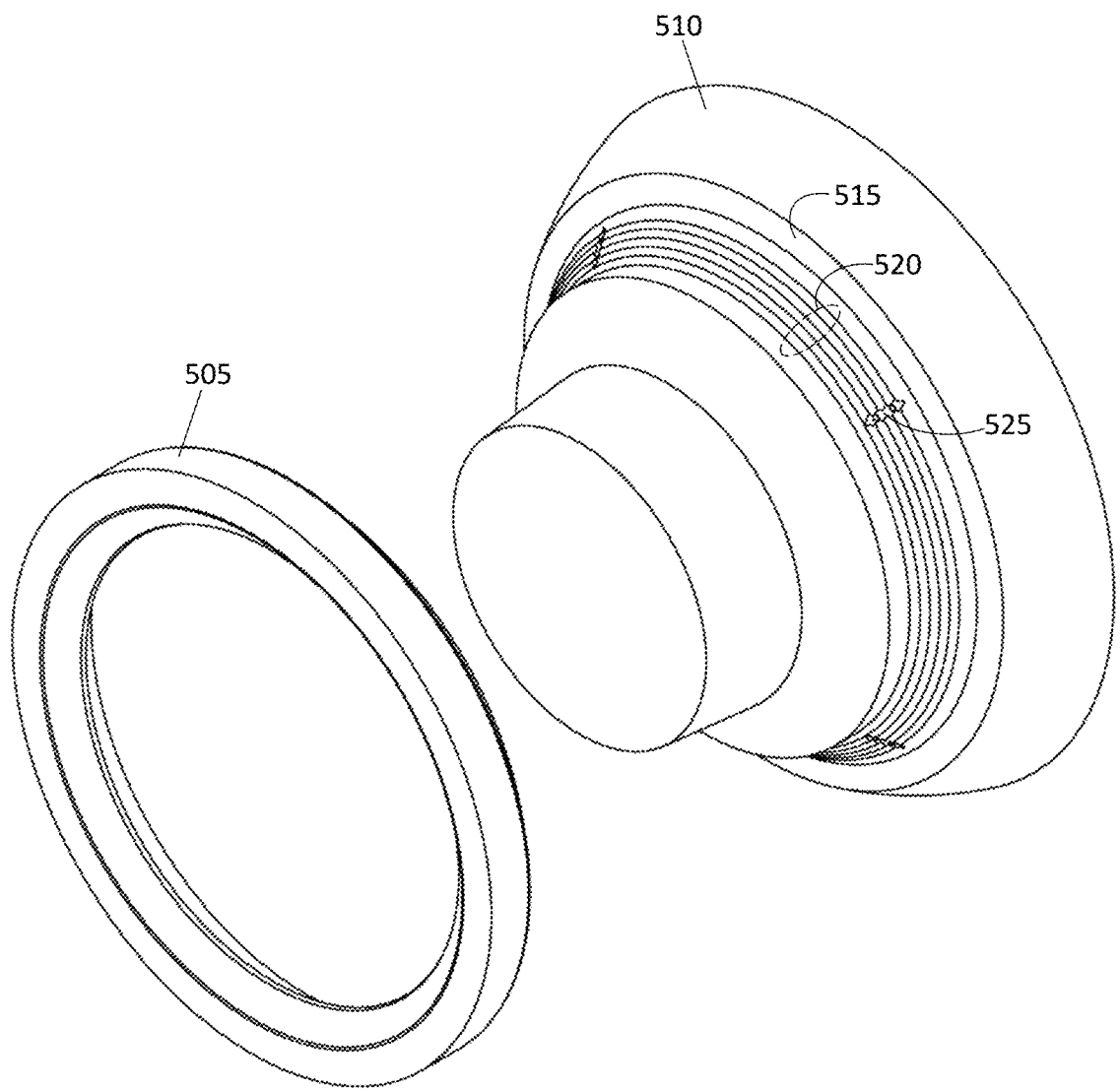
FIG. 5A shows a view of a manufactured core component and outer covering component for a scleral contact lens prior to assembly, in accordance with some embodiments

FIG. 5A shows an exploded view of a manufactured core component and outer covering component for a scleral contact lens prior to assembly, in accordance with some embodiments. The outer covering component 505 is formed from an oxygen permeable material, and has a thickness that facilitates handling of the outer covering component 505. In addition, the core component 510 may also be formed to be thicker than its final desired form. For example, in some embodiments, the core component 510 may include one or more alignment features or edges 515 that serve to align the outer covering component 505 when placed over the core component 510, to ensure that the outer covering component 505 is positioned correctly relative to the core component 510. The core component 510 may further comprise one or more features to facilitate handling of the core component 510.

A patterned structure comprising a plurality of recesses interspersed between a plurality of supports is formed on either the outer covering component 505 or the core component 510. For example, as illustrated in FIG. 5A, the patterned structure may correspond to a plurality of circumferential grooves 520 formed on a portion of the core component 510. In addition, an additional groove 525 may be formed as part of the patterned structure to function as a passage between the grooves of the circumferential grooves 520.

Figure 5B:
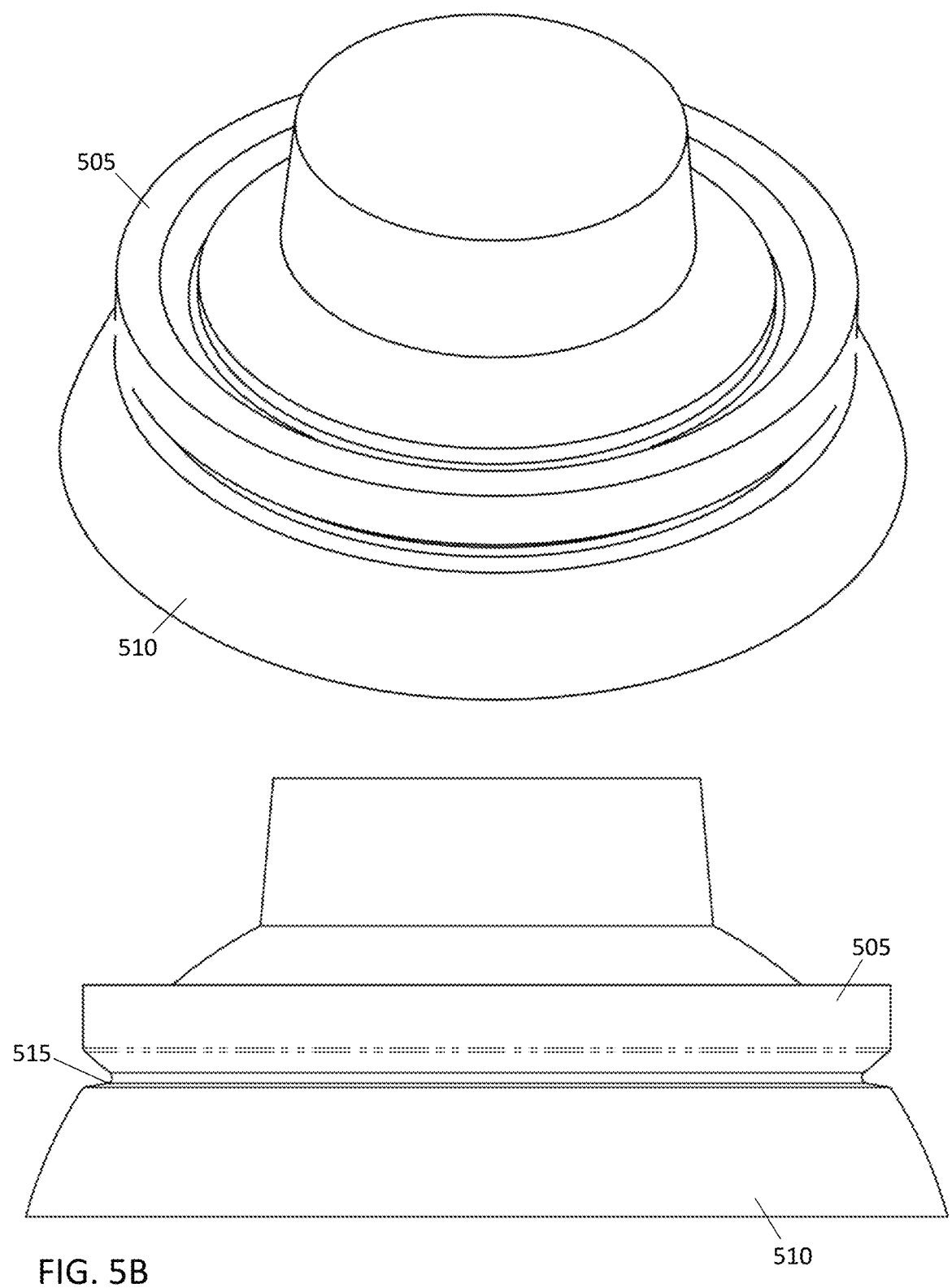
FIG. 5B shows side and perspective views of the core component and outer covering component of FIG. 5A assembled together.

FIG. 5B shows side and perspective views of the core component and outer covering component of FIG. 5A assembled together. As illustrated in FIG. 5B, the outer covering component 505 is placed over the core component 510. The outer covering component 505 may be aligned to the core component 510 using one or more registration features 515. When the outer covering component 505 is placed over the core component 510, an inner surface of the outer covering component 505 and an outer surface of the core component directly contact at the supports of the patterned structure (not shown), e.g., ridges of the patterned structure formed between the circumferential grooves 520. In some embodiments, the outer covering component 505 and core component 510 are fixed to each other using one or more glue layers (not shown).

Figure 5C:
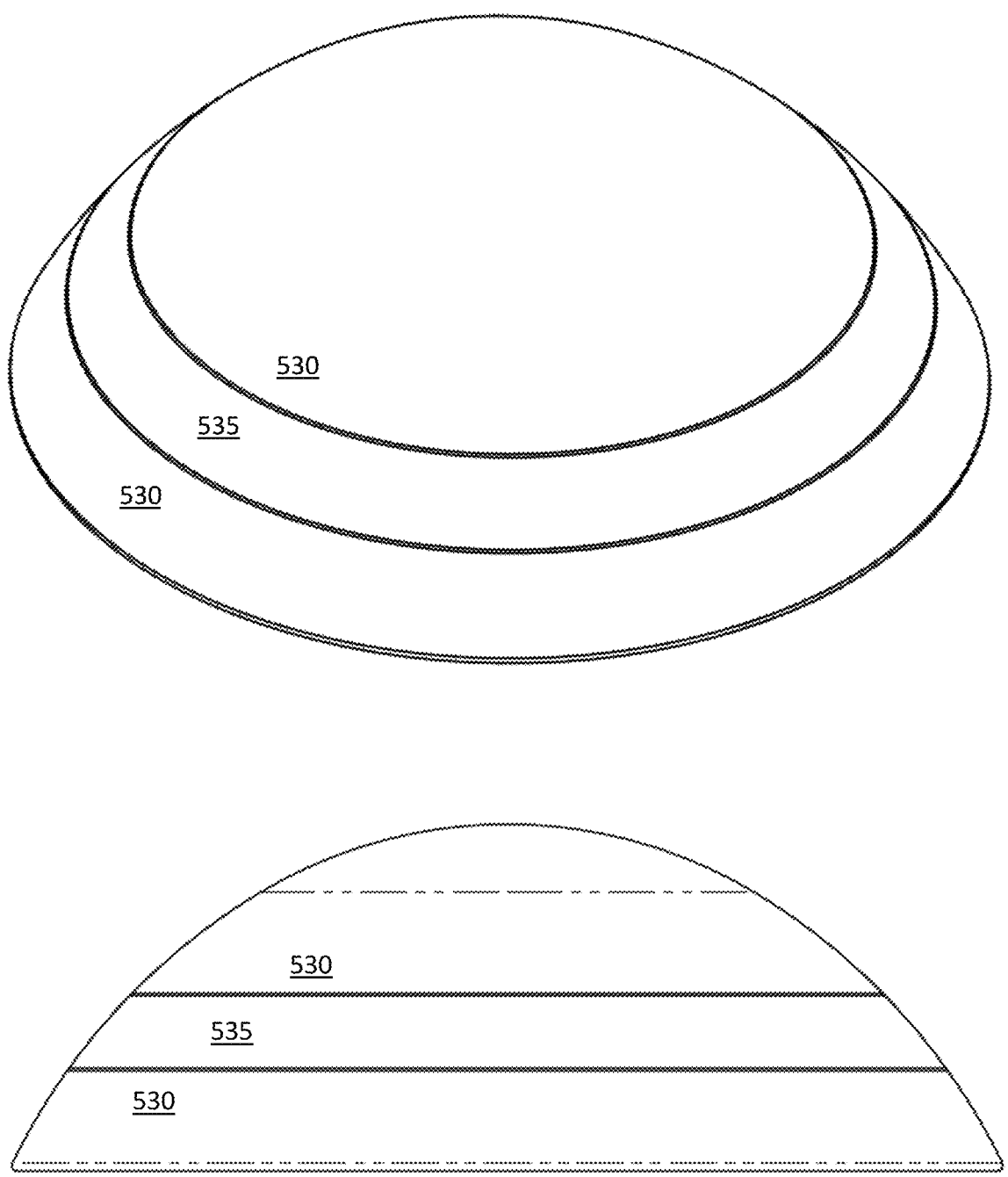
FIG. 5C shows side and perspective views of the core component and outer covering component of FIG. 5A assembled together and cut down to form the scleral contact lens.

FIG. 5C shows side and perspective views of the assembled core component and outer covering component of FIG. 5B cut down to form the scleral contact lens. After the outer covering component 505 has been mounted on the core component 510, an outer surface of the outer covering component 505 and the core component 510 are shaped to their desired form. In some embodiments, excess material of the outer covering component 505 and core component 510 is cut away using a lathe, to form the core 530 and outer covering 535 of the contact lens. The core 530 and outer covering 535 are shaped such that the outer surface of the outer covering aligns with an outer surface of the core, creating a smooth outer surface for the contact lens. In addition, because the outer covering 535 is supported by the core 530 (e.g., via supports of the patterned structure), the outer covering 535 can be shaped to a reduced thickness to facilitate oxygen transmission from the local environment to the outer cavity formed by the recesses of the patterned structure between the outer covering and the core.

FIG. 6A shows a side cross-section view of a core component and outer covering component assembled together, where a patterned structure is formed on the core component, in accordance with some embodiments. FIG. 6A(1) shows a zoomed out cross-section of the core component and outer covering component, while FIG. 6A(2) shows a close-up view of the interface between the core component and outer covering component zoomed in at area B shown in FIG. 6A(1). The core component 610 and outer covering component 605 illustrated in FIG. 6A may correspond to the core component 510 and outer covering component 505 illustrated in FIGS. 5A and 5B. As illustrated in FIG. 6A, the outer covering component 605 is placed against the core component 610 such that an inner surface of the outer covering component 605 directly contacts the supports of a patterned structured 615 formed on a portion of an outer surface of the core component 610. In other embodiments (not shown), the patterned structure is formed on the outer covering component 605, which is aligned such that the supports of the patterned structure contact the outer surface of the core component 610.

The outer covering component and core component may contain extra material relative to their final desired forms, to facilitate handling and/or alignment during assembly. For example, the outer covering component 605 may be formed from a thick material, allowing for it be more easily handled and with less risk of deformation or breakage during assembly. In addition, the core component 610 may comprise alignment features 620 that facilitate alignment between the outer covering component 605 and the core component 610.

In some embodiments, the outer covering component 605 and the core component 610 are fixed to each other via a glue layer 625 deposited at an edge between the outer covering component 605 and the core component 610. In some embodiments, the glue layer 625 may fill a space between the outer covering component 605 and the core component 610 extending to an outer support of the patterned structure 615. However, the outer support of the patterned structure, due to creating direct contact between the core component 610 and outer covering component 605, prevents the glue 625 from reaching the recesses within the patterned structure 615. The glue 625 may function to seal the recesses of the patterned structure 615 away from the outside environment. Consequently, air can only reach the cavity formed between the outer covering component 605 and core component 610 defined by the recesses through the gas permeable material of the outer covering component 605, thus preventing outside debris and contaminants from entering the outer cavity.

FIG. 6B shows a side cross-section view of the core component and outer covering component of FIG. 6A assembled together and cut down to form the scleral contact lens. FIG. 6B(1) shows a zoomed out cross-section, while FIG. 6B(2) shows a close-up view of the interface between the core component and outer covering component zoomed in at area C shown in FIG. 6B(1). As illustrated in FIG. 6B, the assembled outer covering component and core component are cut down to form a core 635 and outer covering 630 having a smooth outer surface 640. The outer covering 630 is shaped to a thickness that allows for a desired amount of oxygen transmission through the outer covering to reach the outer cavity of the contact lens. Because the patterned structure 615 is formed on the core 635 in the embodiment illustrated in FIG. 6B, the outer covering 630 may be shaped to be of substantially uniform thickness. The outer covering 630 is periodically supported by the supports of the patterned structure 615, allowing for the thickness of the outer covering 630 to be reduced relative to if the outer covering did not contact the core between the glue layers 625. For example, in some embodiments, the supports of the patterned structure may be spaced such that the outer covering over the area of the patterned structure does not span a distance of more than 0.5 mm. As such, even though the contact points between the outer covering 630 and the supports of the patterned structure formed on the core 635 may potentially decrease an area of the outer covering 630 through which oxygen can be transmitted, the reduction in thickness that is possible for the outer covering 630 may allow for the overall oxygen transmissibility of the outer covering to increase. In some embodiments, the supports of the patterned structure may be rounded or pointed, to reduce an area of the supports in direct contact with the outer covering.

Figure 7:
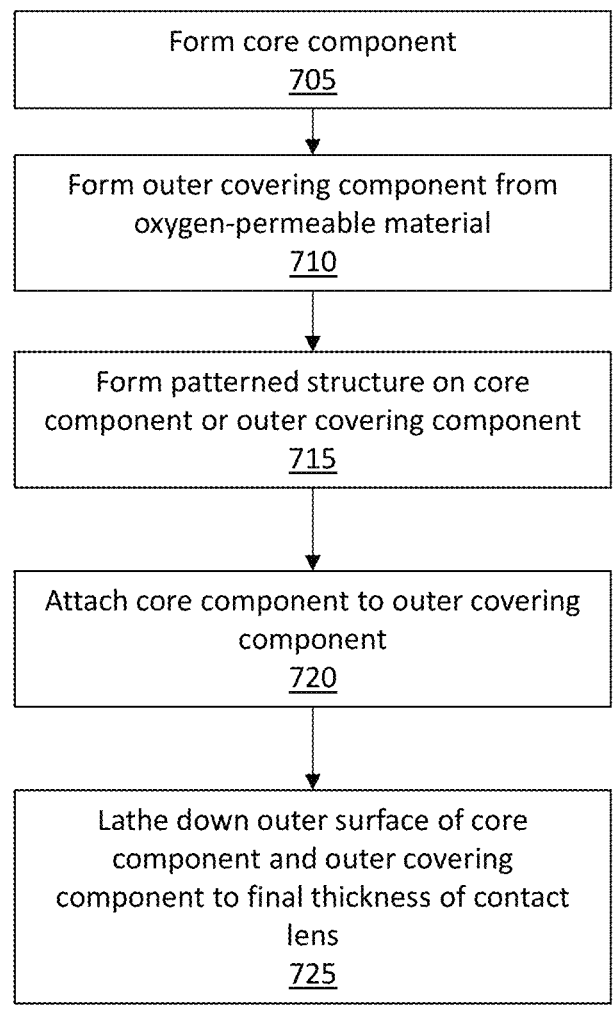
FIG. 7 is a flowchart of a process for forming a scleral contact lens, in accordance with some embodiments.

FIG. 7 is a flowchart of a process for forming a scleral contact lens, in accordance with some embodiments. At 705, a core component is formed. The core component may correspond to the core component 505 illustrated in FIGS. 5A-5C or the core component 605 illustrated in FIGS. 6A and 6B. The core component may be formed to be thicker than the final desired core of the contact lens, and comprise one or more registration features for aligning an outer covering, inner covering, one or more payload components, etc. In some embodiments, the core component is formed from a non-gas permeable material. For example, the material of the core component may be selected to provide structural strength to the contact lens. At least a portion of an outer surface of the core component is shaped to receive a surface of an outer covering component.

At 710, an outer covering component is formed from an oxygen permeable material. The outer covering component comprises at least an inner surface shaped to be mounted on the core component. In some embodiments, the outer covering component is formed thicker in comparison to the final desired outer covering, to facilitate handling and assembly.

At 715, a patterned structure is formed on the core component or the outer covering component. The patterned structure comprises a plurality of recesses interspersed between a plurality of supports. For example, in some embodiments, the patterned structure may comprise one or more blind hole patterns formed on an inner surface of the outer covering component, wherein the blind holes correspond to the recesses and portions of the outer covering component between the blind holes comprise the supports. In some embodiments, portions of the outer covering component between the blind holes may be formed into one or more pillars to function as supports. In some embodiments, the patterned structure may comprise a plurality of circumferential grooves formed on an inner surface of the outer covering component or a portion of the outer surface of the core component, wherein the grooves correspond to recesses and ridges formed between pairs of adjacent grooves correspond to supports.

At 720, the outer covering component is attached to the core component. The outer covering component may be mounted to the core component such that the outer covering component and core component directly contact each other at the supports of the patterned structure. In some embodiments, the outer covering component is attached to the core component via a glue layer formed at the edge of the outer covering component. For example, the glue layer may be formed within a space between the outer covering component and the core component extending to an outer support of the patterned structure, which prevents the glue from entering the recesses of the patterned structure. In some embodiments, an inner surface of the outer covering component is covered with a coating of hydrophilic material prior to the outer covering component being attached to the core component, to improve lubricity of the contact lens and/or to preserve gas permeability of the outer covering component.

At 725, the outer surface of the core component and outer covering component may be shaped to a final desired thickness of the contact lens. In some embodiments, the core component and outer covering component are cut down or lathed to form the final core and outer covering of the contact lens. In some embodiments, once the core component and outer covering component are shaped to the desired form and thickness, a coating of hydrophilic material may be applied to the outer surface of the outer covering.

While the above description primarily discusses a patterned structure associated with the interface between the outer covering and the core, similar techniques may be used to form a patterned structure associated with the interface between the inner covering and the core (e.g., a patterned structured formed on a portion of an inner surface of the core, or an outer surface of the inner covering). This may allow the inner covering to be formed with reduced thicknesses in areas corresponding to the recesses of the patterned structure, which are supported by the supports of the patterned structure.

In some embodiments, because the patterned structure can potentially affect passage of light through the contact lens, the patterned structure is only formed on portions of the contact lens that are outside the central zone of the contact lens. In some embodiments, the outer covering may be disposed entirely outside the central zone of the contact lens. As such, the patterned structured may be formed on the inner surface of the outer covering or on portions of the outer surface of the core to where the outer covering is to be mounted, without substantially affecting passage of light to the user's eye. On the other hand, in embodiments where the inner covering is positioned to cover all or most of the wearer's cornea (e.g., to facilitate even distribution of oxygen across the wearer's cornea through the inner covering), the patterned structure may be formed only on portions of the inner covering or core outside the central zone of the contact lens. It may not be necessary to form a patterned structure associated with the inner covering if a desired level of oxygenation can be achieved with an inner covering of substantially uniform thickness.

The foregoing description of the embodiments of the invention has been presented for the purpose of illustration; it is not intended to be exhaustive or to limit the invention to the precise forms disclosed, but merely illustrates different examples. It should be appreciated that the scope of the disclosure includes other embodiments not discussed in detail above. Persons skilled in the relevant art can appreciate that many modifications and variations are possible in light of the above disclosure, without departing from the spirit and scope as defined in the appended claims. Therefore, the scope of the invention should be determined by the appended claims and their legal equivalents.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A scleral contact lens that mounts to a sclera of an eye, comprising:
    a core having an outer surface that faces outwards away from the eye; and
    a gas-permeable covering having an inner surface that covers at least a portion of the outer surface of the core, the covering's inner surface and the core's outer surface forming an interstitial cavity therebetween that receives oxygen from the external environment through the gas-permeable covering;
    wherein at least one of the core's outer surface and the covering's inner surface comprises a patterned structure, the patterned structure has a plurality of recesses interspersed with a plurality of supports, the core and covering contact each other at the supports, and the recesses form the interstitial cavity.

2. The scleral contact lens of claim 1, wherein the core's outer surface comprises the patterned structure.

3. The scleral contact lens of claim 2, wherein, for a region of the covering facing the patterned structure, the covering has an average thickness of not more than 100 um.

4. The scleral contact lens of claim 1, wherein the patterned structure comprises a pattern of blind holes.

5. The scleral contact lens of claim 4, wherein the pattern of blind holes comprises:
    a first plurality of non-overlapping blind holes, each having a first depth and a first radius; and
    a second plurality of blind holes overlaying the first plurality of blind holes, each having a second depth shallower than the first depth and a second radius larger than the first radius, wherein the second plurality of blind holes overlap with each other to form a plurality of columns between the first plurality of blind holes.

6. The scleral contact lens of claim 4, wherein the blind holes are arranged in a hexagonal pattern.

7. The scleral contact lens of claim 4, wherein the blind holes are frustums.

8. The scleral contact lens of claim 1, wherein the patterned structure comprises a plurality of concentric grooves.

9. The scleral contact lens of claim 1, wherein the patterned structured covers an area of not more than 100 mm$^2$.

10. The scleral contact lens of claim 1, wherein a distance to a nearest support does not exceed 0.5 mm for any point in the interstitial cavity.

11. The scleral contact lens of claim 1, wherein the covering has an annular shape with an area of not more than 100 mm².

12. The scleral contact lens of claim 1, wherein the covering has an annular shape with a width of not more than 3 mm.

13. The scleral contact lens of claim 1, wherein the core has an inner surface that faces inwards towards a cornea of the eye, and the scleral contact lens further comprises:
   a gas-permeable inner covering under the core's inner surface and disposed over the cornea of the eye, the inner covering and the core's inner surface forming a second interstitial cavity therebetween that passes oxygen to the cornea of the eye through the gas-permeable inner covering;
   wherein the core has air paths for flow of oxygen through the core between the two interstitial cavities.

14. The scleral contact lens of claim 1, wherein the core carries an electronic payload.

15. The scleral contact lens of claim 14, wherein the electronic payload comprises a femtoprojector that projects images onto a retina of the eye.

16. The scleral contact lens of claim 1, wherein an outer surface of the covering and the inner surface of the covering are coated with a hydrophilic material configured to preserve gas-permeability of the covering.

17. The scleral contact lens of claim 1, wherein a portion of the core not covered by the covering is coated with a hydrophilic material.

18. A scleral contact lens that mounts to a sclera of an eye, comprising:
   a core having an outer surface that faces outwards away from the eye; and
   a gas-permeable covering having an inner surface that covers at least a portion of the outer surface of the core, the covering's inner surface and the core's outer surface forming an interstitial cavity therebetween that receives oxygen from the external environment through the gas-permeable covering;
   wherein at least one of the core's outer surface and the covering's inner surface comprises a patterned structure, the patterned structure has a plurality of recesses interspersed with a plurality of supports, the core and covering contact each other at the supports, the recesses form the interstitial cavity, and the covering's inner surface comprises the patterned structure.

19. The scleral contact lens of claim 18, wherein, within the patterned structure, the covering has a thickness of not more than 100 um over at least ⅓ of an overall area of the patterned structure.

20. A scleral contact lens that mounts to a sclera of an eye, comprising:
   a core having an outer surface that faces outwards away from the eye; and
   a gas-permeable covering having an inner surface that covers at least a portion of the outer surface of the core, the covering's inner surface and the core's outer surface forming an interstitial cavity therebetween that receives oxygen from the external environment through the gas-permeable covering;
   wherein at least one of the core's outer surface and the covering's inner surface comprises a patterned structure, the patterned structure has a plurality of recesses interspersed with a plurality of supports, the core and covering contact each other at the supports, the recesses form the interstitial cavity, and the patterned structure comprises a plurality of grooves.

21. A contact lens mountable on an eye, the lens comprising:
   a core having an outer surface that faces outwards, away from the eye, and an inner surface that faces inwards, towards the eye;
   a gas-permeable outer covering having an inner surface that covers at least a portion of the outer surface of the core, the outer covering's inner surface and the core's outer surface forming a first interstitial cavity therebetween that receives oxygen from surrounding air through the gas-permeable outer covering;
   a gas permeable inner covering that covers at least a portion of the core's inner surface, the inner covering and the core's inner surface forming a second interstitial cavity therebetween that passes oxygen to the eye through the gas-permeable inner covering; and
   at least one air path through the core that permits oxygen to flow between the first and second interstitial cavities;
   wherein at least one of the core's outer surface and the outer covering's inner surface comprises a plurality of recesses interspersed with a plurality of supports, the core and the outer covering contacting each other at the supports, and the recesses forming the first interstitial cavity.

22. The contact lens of claim 21, wherein the core carries a payload.

23. The contact lens of claim 22, wherein the payload comprises a femtoprojector.

\* \* \* \* \*